(12) United States Patent
Igarashi et al.

(10) Patent No.: US 8,480,455 B2
(45) Date of Patent: Jul. 9, 2013

(54) LENS MACHINING APPARATUS AND METHOD

(75) Inventors: Takashi Igarashi, Tokyo (JP); Shuichi Sato, Tokyo (JP); Yoshihiro Kikuchi, Tokyo (JP); Michio Arai, Tokyo (JP); Satoshi Annaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 754 days.

(21) Appl. No.: 10/611,918

(22) Filed: Jul. 3, 2003

(65) Prior Publication Data
US 2004/0097168 A1 May 20, 2004

Related U.S. Application Data

(63) Continuation of application No. 09/787,014, filed as application No. PCT/JP00/05201 on Aug. 3, 2000, now Pat. No. 6,623,339.

(30) Foreign Application Priority Data

| Aug. 6, 1999 | (JP) | 11-224590 |
|---|---|---|
| Aug. 6, 1999 | (JP) | 11-224593 |
| Aug. 6, 1999 | (JP) | 11-224595 |
| Aug. 6, 1999 | (JP) | 11-224616 |
| Aug. 6, 1999 | (JP) | 11-224625 |

(51) Int. Cl.
*B24B 49/00* (2012.01)

(52) U.S. Cl.
USPC .................................. 451/42; 451/5

(58) Field of Classification Search
USPC .......................... 451/42–44, 5, 6, 8
See application file for complete search history.

(56) References Cited

U.S. PATENT DOCUMENTS

| 4,115,956 A | 9/1978 | Huffman |
| 4,772,160 A | 9/1988 | Barwasser |
| 4,989,316 A | 2/1991 | Logan et al. |
| 5,053,971 A | 10/1991 | Wood et al. |
| 5,149,337 A | 9/1992 | Watanabe |
| 5,363,597 A | 11/1994 | Gottschald et al. |
| 5,738,563 A | 4/1998 | Shibata |

(Continued)

FOREIGN PATENT DOCUMENTS

| FR | 2 499 442 A | 8/1982 |
| JP | U 58-106112 | 7/1983 |

(Continued)

OTHER PUBLICATIONS

English language translation of Apr. 19, 2007 Office Action.
English-language translation of Japanese Office Action, May 8, 2007.

*Primary Examiner* — Hadi Shakeri
(74) *Attorney, Agent, or Firm* — Oliff & Berridge, PLC

(57) ABSTRACT

A lens machining apparatus is provided that can execute everything required in machining eyeglass lenses, from measurement to various kinds of machining, and still ensures high-precision machining. The apparatus includes a lens holding unit 12 which holds a lens 1 and causes the same to turn, a cutter 131 which cuts (edges) the circumferential surface of the lens in a prescribed cross-sectional shape, an end mill 141 which machines a groove in the circumferential surface of the lens whose circumferential surface has been cut (edged) and chamfers edges at the lens circumferential surface, and a lens measurement unit 15 which measures the shape and the position of the lens held by the lens holding unit.

1 Claim, 26 Drawing Sheets

U.S. PATENT DOCUMENTS

| | | | |
|---|---|---|---|
| 5,775,973 | A | 7/1998 | Watanabe |
| 5,882,247 | A | 3/1999 | Longuet et al. |
| 5,993,295 | A | 11/1999 | Raffaelli |
| 6,012,965 | A | 1/2000 | Savoie |
| 6,050,877 | A | 4/2000 | Shibata et al. |
| 6,059,635 | A | 5/2000 | Mizuno |
| 6,080,044 | A | 6/2000 | Lanham et al. |
| 6,099,383 | A | 8/2000 | Mizuno et al. |
| 6,123,604 | A | 9/2000 | Mizuno et al. |
| 6,203,409 | B1 | 3/2001 | Kennedy et al. |
| 6,220,929 | B1 | 4/2001 | Mizumo |
| 6,276,994 | B1 | 8/2001 | Yoshida et al. |
| 6,478,657 | B1 * | 11/2002 | Shibata .............................. 451/5 |

FOREIGN PATENT DOCUMENTS

| | | |
|---|---|---|
| JP | 61-014849 | 1/1986 |
| JP | 62-292354 | 12/1987 |
| JP | 64-016346 | 1/1989 |
| JP | A-64-16346 | 1/1989 |
| JP | 04-019713 U | 1/1992 |
| JP | A 4-315563 | 11/1992 |
| JP | A 5-4156 | 1/1993 |
| JP | A 5-131350 | 5/1993 |
| JP | 05-345268 | 12/1993 |
| JP | 06-055324 | 3/1994 |
| JP | U-06-17853 | 5/1994 |
| JP | 07-040191 | 2/1995 |
| JP | A-07-40191 | 2/1995 |
| JP | B2 8-16611 | 2/1996 |
| JP | A 9-309051 | 12/1997 |
| JP | A 9-309052 | 12/1997 |
| JP | 10-138109 | 5/1998 |
| JP | 10-296602 | 11/1998 |
| JP | A 11-10427 | 1/1999 |
| JP | A 11-28650 | 2/1999 |
| JP | 11-058196 | 3/1999 |

* cited by examiner

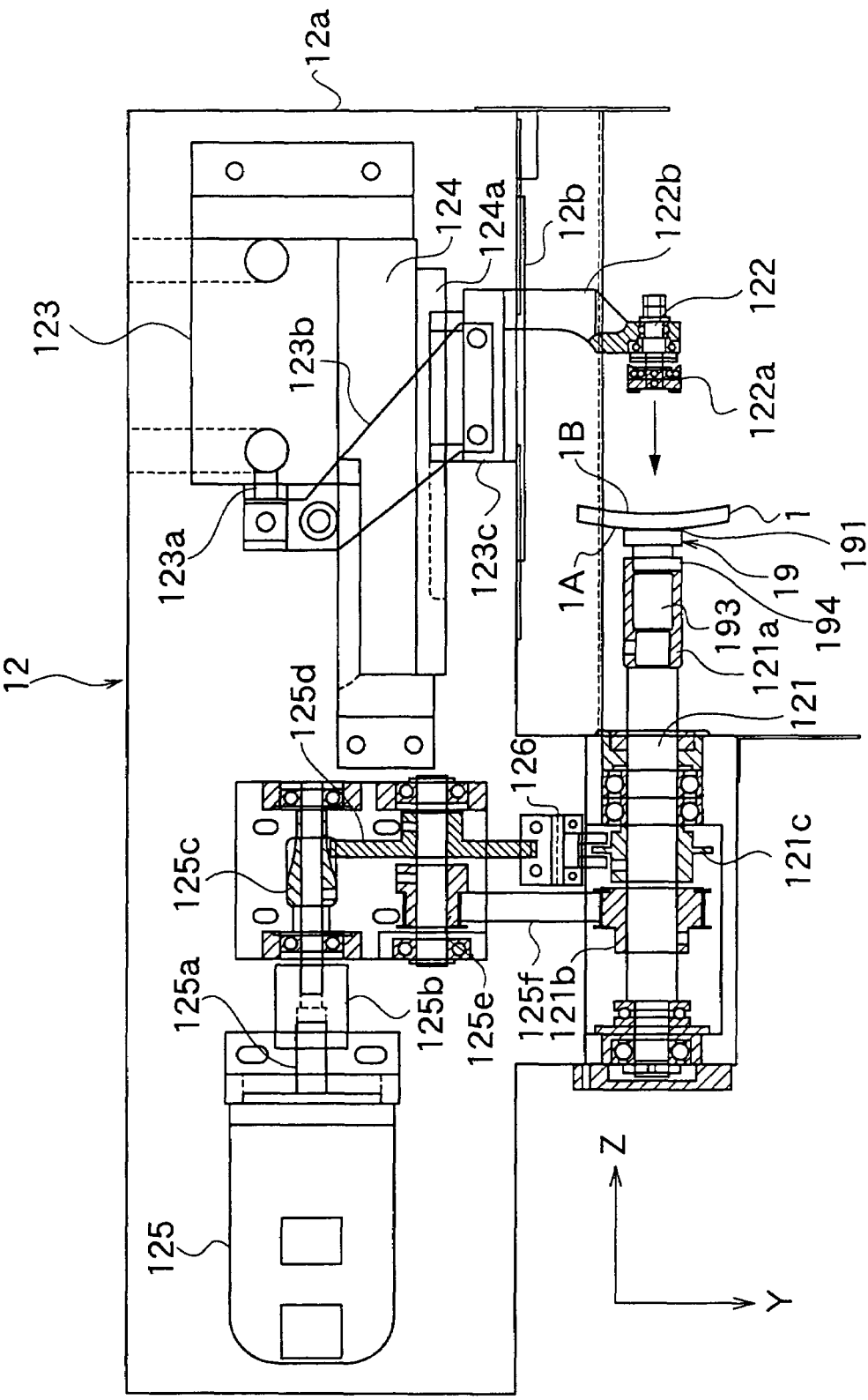

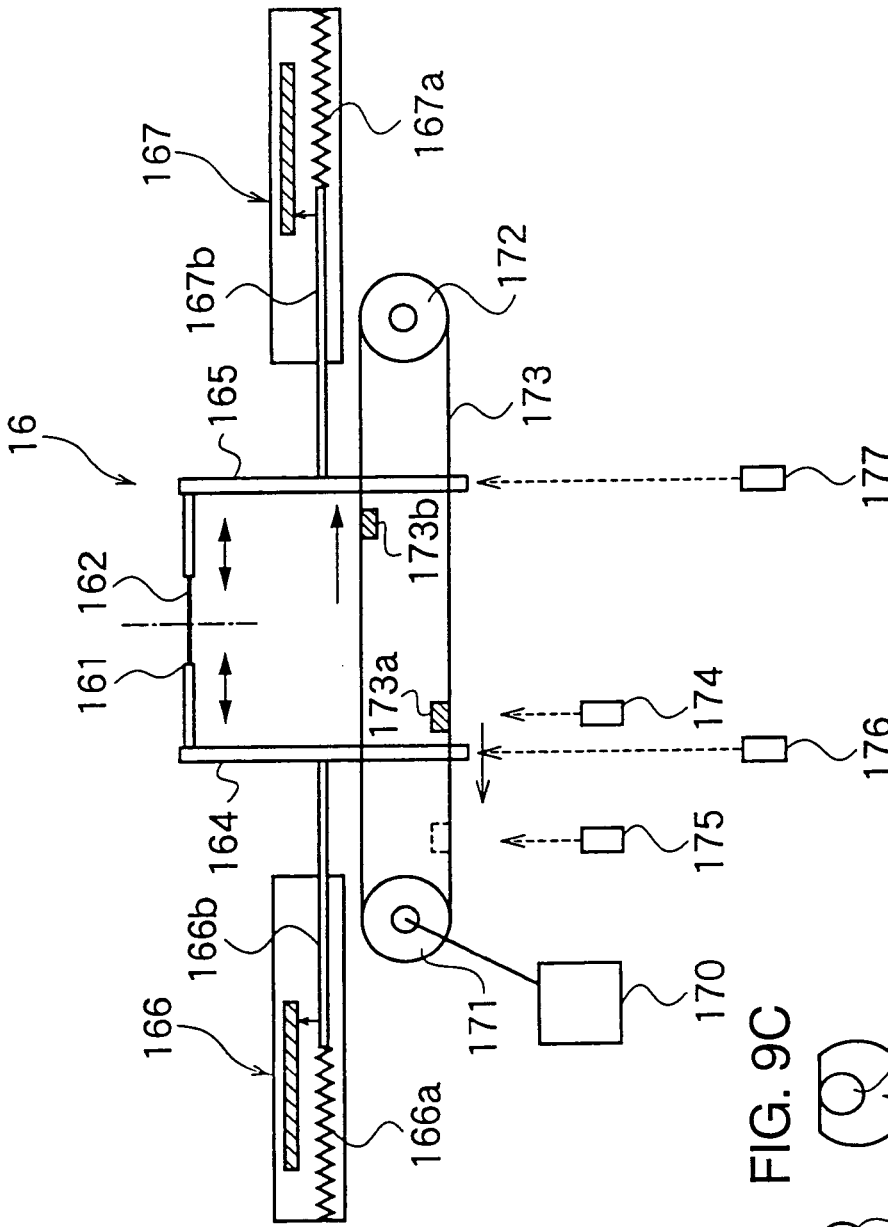
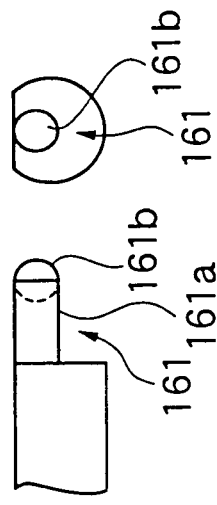

MEASUREMENT PROBE (CONVEX FACE SIDE)    MEASUREMENT PROBE (CONCAVE FACE SIDE)

TURNING DIRECTION

1) BEVEL ANGLE : 110°~125°
2) BEVEL HEIGHT
   SMALL BEVEL : 0.4mm~0.68mm
   LARGE BEVEL : 0.7mm~0.9mm

GROOVE
CUTTING(EDGING)    CHAMFERING
MACHINING          MACHINING

TURNING DIRECTION

TURNING DIRECTION

TURNING DIRECTION

TURNING DIRECTION

FIG.24

| HY ⇨ / HT ⇩ | | MACHINING SPEED (HY1) → EDGE THICKNESS (HY2) → | 1 | | 2 | |
|---|---|---|---|---|---|---|
| | | | THICK | THIN | THICK | THIN |
| HT1 → | CIRCUMFERENTIAL SURFACE ROUGH MACHINING | FEED SPEED (LENS SHAFT TURNING SPEED) | 02 | 02 | 03 | 04 |
| | | TOOL TURNING SPEED | 05 | 05 | 04 | 04 |
| HT2 → | CIRCUMFERENTIAL SURFACE FINISHING MACHINING | FEED SPEED (LENS SHAFT TURNING SPEED) | 05 | 05 | 05 | 05 |
| | | TOOL TURNING SPEED | 02 | 02 | 00 | 00 |
| HT3 → | GROOVE MACHINING | FEED SPEED (LENS SHAFT TURNING SPEED) | 02 | 02 | 04 | 04 |
| | | TOOL TURNING SPEED | 01 | 01 | 00 | 00 |
| HT4 → | CHAMFERING | FEED SPEED (LENS SHAFT TURNING SPEED) | 02 | 02 | 04 | 04 |
| | | TOOL TURNING SPEED | 01 | 01 | 00 | 00 |

LENS MACHINING APPARATUS AND METHOD

This is a Divisional of application Ser. No. 09/787,014 filed Mar. 21, 2001, now U.S. Pat. No. 6,623,339 which is a U.S. National Stage Application of PCT/JP00/05201 filed Aug. 3, 2000. The entire disclosure of the prior application is hereby incorporated by reference herein in its entirety.

TECHNICAL FIELD

This invention relates to a lens machining apparatus and lens machining method which machines the circumferential edges of lenses being machined to prescribed shapes for the purpose of inserting eyeglass lenses or other lenses being machined into lens frames.

BACKGROUND ART

For this type of lens machining apparatus, conventionally, a grindstone type lens machining apparatus has been used wherewith the lens circumferential edge is machined into the prescribed shape by grinding (edging) the circumferential surface of the lens with a grindstone. Insofar as plastic lenses are concerned, however, it is possible to do this by edging and machining. More recently, therefore, edging (cutting) type lens machining apparatuses have been developed wherewith the lens circumferential surface is edged (cut) with a cutter. This type of edging lens machining apparatus is disclosed in Japanese Patent Application Laid-Open No. H9-309051/1997 (published) and Japanese Patent Application Laid-Open No. H11-028650/1999 (published), for example. In Japanese Patent Application Laid-Open No. H4-315563/1992 (published) and Japanese Patent Application Laid-Open No. H5-4156/1993 (published), moreover, technology is disclosed for setting and altering the grinding (edging) load on the grindstone according to the lens circumferential edge thickness, with the object of preventing lens cracking and efficiently performing suitable machining in cases where the circumferential surface of a lens is ground (edged) with a grindstone (revolving machining tool for machining circumferential surfaces) and the lens circumferential edge is machined to a prescribed shape.

However, with the edging type lens machining apparatus described in Japanese Patent Application Laid-Open No. H9-309051/1997 (published) and Japanese Patent Application Laid-Open No. H11-028650/1999 (published), executing the entire machining menu demanded for eyeglass lenses with a single chuck operation in one apparatus (where a single chuck operation means one lens holding operation wherewith there is no movement of a lens between different apparatuses) is something that still cannot be done. More specifically, in an ordinary eyeglass lens machining menu, (1) lens circumferential surface edging and machining (inclusive of bevel edging)
(2) machining for forming grooves in lens circumferential surfaces, and
(3) chamfering edges where the lens circumferential surface and lens faces intersect are included, but it has not been possible to handle all of these menu items with one chuck operation in one apparatus. In particular, because high machining precision is demanded in bevel edging, groove machining, and chamfering, the ideal is to be able to do this with one chuck operation, inclusive of measuring the shape and position of the lens being machined, but art wherewith that can be done has not been available. Nor has it always been possible, merely by setting and altering the grindstone grinding (edging) load according to the lens circumferential thickness, as in the art described in Japanese Patent Application Laid-Open No. H4-315563/1992 (published) and H5-4156/1993 (published), to perform machining of good precision or machining exhibiting good finished surfaces.

An object of the present invention, in view of the situation described in the foregoing, is to provide a lens machining apparatus and lens machining method wherewith the machining demanded for eyeglass lenses, from measurement to various machining items, can be accomplished with a single chuck operation, and wherewith it is possible to realize high-precision machining.

DISCLOSURE OF THE INVENTION

A first invention is a lens machining apparatus which machines the circumferential edge of a lens being machined for use in spectacles according to shape data, comprising: a lens holding unit which holds the lens being machined at the center of the lens and rotates the held lens being machined about the center of the lens; a circumferential surface edging and machining apparatus which edges the circumferential surface of the lens being machined that is held in the lens holding unit to a prescribed cross-sectional shape by a revolving edging tool; a groove machining apparatus which machines a groove in the circumferential surface of the lens being machined that is being held in the lens holding unit and that has been subjected to circumferential surface edging by the circumferential surface edging and machining apparatus; a chamfering apparatus which chamfers the edges where the circumferential surface and lens faces intersect in the lens being machined that is being held in the lens holding unit and that has been subjected to circumferential surface edging by the circumferential surface edging and machining apparatus; and a lens shape measurement apparatus which measures the lens surface shape and the lens surface position of the lens being machined being held in the lens holding unit.

With this apparatus, for the lens being machined held in the lens holding unit, lens circumference surface edging and machining can be rendered by the circumferential surface edging and machining apparatus, a groove can be machined in the circumferential surface of the lens by the groove machining apparatus, and the circumferential surface edges of the lens can be chamfered by the chamfering apparatus. Not only so, but the lens surface shape and lens surface position of the lens being machined held by the lens holding unit in the same manner can be measured by the lens shape measurement apparatus. Accordingly, by measuring the lens shape and position with the lens being machined still held with the same chuck, when bevel edging is required, bevels can be formed with good precision by circumferential surface edging, and when groove machining is required, a groove can be formed in the lens circumferential surface with good precision. Furthermore, in cases where chamfering is performed also, chamfered bevels can be formed with good precision in lens circumferential surface edges based on the measurement data and the machining particulars.

When provision is made for edging and machining the circumferential surface of a lens with a revolving edging tool, as in the present invention, furthermore, as compared to edging with a grindstone, the amount of edging in can be freely set, wherefore the process up to and including the finished shape can be freely controlled. For example, goal settings can be freely implemented, such as setting how many times to rotate the lens in performing everything up to finishing, or setting the number of seconds in which the machining is to be concluded.

A second invention is the first invention, comprising a machining action mechanism wherein the circumferential surface edging and machining apparatus, the groove machining apparatus, and the chamfering apparatus are deployed fixedly, which subjects the held lens being machined to machining actions by moving the lens holding unit relative to those machining apparatuses.

With this apparatus, the machining apparatuses are caused to perform machining actions by moving the lens being machined itself relative to the tools of the machining apparatuses. Accordingly, the machining apparatuses themselves need do nothing more than turn the tools, and the apparatus configuration is made simple.

A third invention is either the first or the second invention, wherein: the circumferential surface edging and machining apparatus and the groove machining apparatus are deployed adjacently on a base; the axis of the revolving tool of the groove machining apparatus is deployed in a direction perpendicular to the lens holding shaft of the lens holding unit and oriented in a direction parallel to the base; and the axis of the revolving tool of the groove machining apparatus, the axis of the revolving edging tool of the circumferential surface edging and machining apparatus, and the axis of the lens holding shaft are deployed at the same height.

With this apparatus, not only are the circumferential surface edging and machining apparatus and the groove machining apparatus deployed adjacently, but the axes thereof are aligned at the height of the axis of the lens holding shaft, wherefore a compact machining apparatus can be realized.

A fourth invention is any of the first to third inventions, wherein: the lens holding unit comprises a lens holding shaft and a lens pressing shaft; a lens holder receptacle which mounts the lens being machined is provided at the forward end of the lens holding shaft; the lens pressing shaft itself is deployed coaxially with the lens holding shaft, attached so that it can slide in the lens holding shaft direction by an arm unit; the lens pressing shaft, acted on by pressure from an air cylinder, moves to the lens holding shaft side, and presses the lens being machined by the lens presser of the forward end thereof to the lens holding shaft side, whereby the lens being machined is held sandwiched between the lens holding shaft and the lens pressing shaft.

With this apparatus, air is used as the source of the drive for obtaining a lens holding force, and the lens holding force (so-called chuck pressure) can be freely adjusted by changing the pressure setting in a regulator.

A fifth invention is any of the first to fourth inventions, wherein both the groove machining apparatus and the chamfering apparatus are configured by a common ball end mill.

With this invention, groove machining and chamfering are done with an end mill of small diameter used for groove edging. Therefore, compared to machining done with a conventional grindstone, small chamfered bevels can be accurately finished with little interference with other places. Also, because a single end mill is used for both groove edging and chamfering, the number of tools can be decreased, which contributes to cost reduction. Also, because groove edging and chamfering machining can be done in more or less immediate succession with a single chuck operation, machining time can be reduced. Furthermore, because a single drive system suffices due to the employment of one tool for different uses, the apparatus can be made smaller and costs reduced. And, because the number of tools is not increased, tool management is also made easy.

A sixth invention is a lens machining method wherein: a lens being machined for use in spectacles is held at the center of the lens, the circumferential surface of the held lens being machined is edged by a revolving machining tool for circumferential surface machining, the circumferential surface is edged about the entire circumference of the lens being machined by causing the lens being machined to revolve about the center of the lens, and a lens having a prescribed circumferential edge shape is thereby machined; the lens being machined is held by a lens holding unit; and lens circumferential surface edging and machining inclusive of bevel edging, machining to edge a groove in the lens circumferential surface, and chamfering the edges where the lens circumferential surface and the lens faces intersect are performed with the holding condition implemented by the lens holding unit maintained as it is.

This is a method that executes the entire machining menu demanded for eyeglass lenses with a single chuck operation in one apparatus (where a single chuck operation means one lens holding operation wherewith there is no movement of the lens between different apparatuses). In other words, machining wherein particularly high machining precision is required, such as bevel edging, groove edging, and chamfering, is performed with a single chuck operation, so that it is possible to do such machining with higher precision than in the conventional case where it is necessary to re-chuck the work for every machining process.

A seventh and an eighth invention are lens machining methods wherein: a lens being machined for use in spectacles is held at the center of the lens, the circumferential surface of the held lens being machined is edged by a revolving machining tool for circumferential surface machining, the circumferential surface is edged about the entire circumference of the lens being machined by causing the lens being machined to revolve about the center of the lens, and a lens having a prescribed circumferential edge shape is thereby machined; and at least one or other of the turning speed of the revolving machining tool for circumferential surface edging, the turning speed of the lens being machined when it is revolving, and the number of revolutions of the lens being machined for edging away a prescribed amount of material is set and altered according to either the material type or the lens circumferential edge thickness of the lens being machined.

In some cases the revolving machining tool for the circumferential surface machining is a cutter for performing edging with a cutting blade provided at the outer periphery of the circumferential surface of the lens being machined.

In the case of a plastic lens, for example, there are both soft materials and hard materials. And in the case of an eyeglass lens, the lens circumferential edge thickness (edge thickness) differs according to the power. When such is machined under uniform machining conditions, the machining load will naturally be different depending on the hardness of the material and the lens circumferential edge thickness. Therefore, not only will the machining precision vary according to machining load differences, but there is a possibility that machining efficiency will also be affected. That being so, in the seventh to ninth inventions, provision is made for setting and altering the machining conditions according to the material and the lens circumferential edge thickness.

The machining conditions in such cases include the turning speed of the cutter, grindstone, or other revolving machining tool for circumferential surface edging, the turning speed when the lens being machined is revolving, and the number of revolutions in the lens being machined for edging away a prescribed amount of material. By setting and altering at least one of these parameters, the machining conditions can be made more appropriate.

In the case of an eyeglass lens, for example, as the final finished shape is approached, the lens circumferential edge shape will cease to be circular, wherefore the moving radial (radius) from the center of turning to the machining point (that is, the point where the tool is made to interfere with the lens and actually edge away the lens) will vary according to the turning angle of the lens being machined. Thereupon, the angular velocity of the lens when turning is controlled to make the circumferential speed of the machining point caused by the lens turning to be uniform. By so doing, the speed of movement of the lens (that is, the speed of movement of the machining point) relative to the tool will become the same, and the entire circumference can be machined under more or less the same conditions.

Furthermore, by varying the turning speed of the revolving machining tool itself according to the movement of the machining point, without varying the lens turning angle speed, the entire circumference can be machined under more or less the same conditions.

A tenth invention is a lens machining method wherein: a lens being machined is caused to revolve about the center of the lens while applying a revolving groove tool to the circumferential surface of the lens being machined that has been machined to a prescribed circumferential edge shape, whereby a groove is formed in the circumferential surface of the lens being machined; and at least one or other of the turning speed of the revolving groove tool and the turning speed when the lens being machined is revolving is set and altered according to the material of the lens being machined.

An 11th invention is a lens machining method wherein: a lens being machined is caused to revolve about the center of the lens while applying a revolving chamfering tool to the edges where the lens faces and the circumferential surface of the lens being machined that has been machined to a prescribed circumferential edge shape intersect, whereby the edges are chamfered; and at least one or other of the turning speed of the chamfering tool and the turning speed when the lens being machined is revolving is set and altered according to the material of the lens being machined.

Groove edging and chamfering are not machining processes which edge away a large amount of material, wherefore the machining may be completed by causing the lens to revolve only one time. That being so, although the number of lens revolutions was added as a settable and alterable parameter for the case of circumferential surface machining, here that factor is removed from the parameters. Furthermore, because neither groove edging nor chamfering is a machining item wherein the machining load is influenced by differences in the lens circumferential edge thickness, lens circumferential edge thickness is also eliminated from the machining conditions. Thereupon, only the material of the lens being machined is left as a condition, and, in terms of parameters, provision is made for setting and altering the turning speed of the revolving groove tool or chamfering tool, and the turning speed when the lens being machined is revolving.

Thus, by setting and altering at least one of two parameters, according to the material of the lens being machined, the machining conditions can be made more appropriate.

A 12th invention is a lens machining method wherein: a lens being machined is held by the center of the lens, the circumferential surface of the held lens being machined is edged away by a revolving machining tool for circumferential surface machining, and the lens being machined is caused to revolve about the center of the lens, whereby the circumferential surface is edged away about the entire circumference of the lens being machined, and the lens is thereby machined to a prescribed circumferential edge shape; and at least one or other of the turning speed of the revolving machining tool for edging the circumferential surface or the turning speed when the lens being machined is revolving is set and altered, when roughly machining the circumferential surface of the lens being machined, and when thereafter performing finishing machining.

A 13th invention is the 12th invention, wherein a cutter that edges the circumferential surface of the lens being machined with a cutting blade deployed at the outer circumference thereof is used as the revolving machining tool for circumferential surface machining.

A 14th invention is the 13th invention, wherein both rough machining and finishing machining are done with the same cutter.

Rough machining, in general, is the process of removing edging material up to the point where finishing machining is performed. Therefore, there is no need to elicit dimensional precision or finished surface precision, and it is better if the prescribed amount of edging material can be removed quickly. Thereupon, such is implemented by raising the feed speed (the turning speed wherewith the lens revolves) and/or setting the depth of edging to make it deeper. Here, in order to deepen the edging depth, the edging load may be made large in the case of edging with a grindstone, or the feed speed in the edging depth direction may be set higher in the case of edging with a cutter. Finishing machining, on the other hand, is a process where dimensional precision and finished surface precision are elicited, wherefore raising the turning speed of the grindstone or cutter or other revolving machining tool and/or lowering the feed speed is commonly practiced.

When such is done, in the case of circumferential surface edging with a cutter, both rough machining and finishing machining can be performed by changing the turning speed of the cutter.

A 15th invention is a lens measurement method wherein: in machining the circumferential edge of an eyeglass lens being machined according to lens frame shape data, a stylus is caused to make a trace on the lens face of the lens being machined that is held by a lens holding unit, according to the lens frame shape data, and the displacement of that stylus in the lens thickness dimension is detected, whereby the position on the lens face is measured; and positions on the lens face at points removed from the traced points are calculated using measurement data for the points traced by the stylus and lens design data inclusive of lens face information for the lens being machined previously given.

In the 15th invention, the lens design data includes complete coordinate data (lens face information) relating to the lens faces. Accordingly, if the stylus is made to trace the lens face according to the lens frame shape data in the condition wherein the lens is held and the position on the lens face is actually measured, based on that actually measured data and on separately given lens design data, positional data for any position on the lens face can be calculated. Accordingly, when bevel edging is being done, for example, by using computations to calculate positional data for the edges on both sides of the base of the bevel, and performing the bevel edging based on those data, the position of the bevel can be finished with good precision.

A 16th invention is the 15th invention, wherein the points removed away from the traced points are made the edges where the lens circumferential surface and the lens faces of the lens being machined intersect after circumferential surface finishing machining.

In the case of the 16th invention, because the points where the positions on the lens faces are sought are made the edges where the lens circumferential surface and the lens faces of the lens being machined intersect after circumferential surface finishing machining, in the case of bevel edging, for example, when the lens circumferential surface is groove machined, or when chamfering the edge, those can be finished with good precision.

A 17th invention is the 16th invention, wherein: the stylus is caused to trace the lens face at positions on an extended line in the direction of the lens holding shaft at the bevel apex when bevel edging the lens circumferential surface; and the points removed away from the traced points are made the edges at the intersections of the lens faces and the lens circumferential surface corresponding to the base of the bevel.

With the 17th invention, when doing bevel edging, positional data are acquired for the edges at the intersections of the lens faces and the lens circumferential surface corresponding to the base of the bevel, wherefore the position of the bevel can be finished with good precision based on the data for the edges at those intersections.

An 18th invention is any one of the 15th to 17th inventions, wherein a pair of styluses is used, and positions on the front and back lens faces are measured simultaneously by causing the front and back lens faces of the lens being machined to be traced.

With the 18th invention, because positions on the front and back lens faces are measured simultaneously with the pair of styluses, the edge thickness can be calculated from those data.

A 19th invention is a lens machining method wherein: a lens measurement method cited in any one of inventions 15 to 18 cited above is used; data on positions on the lens faces of the lens being machined are acquired; and the lens being machined is subjected to circumferential surface machining based on those data.

With the 19th invention, lens circumferential surface machining is performed on the bases of data acquired by a measurement method described earlier, wherefore the circumferential surface machining precision can be raised.

A 20th invention is the 19th invention, wherein a bevel is formed in the lens circumferential surface when performing the circumferential surface machining.

With the 20th invention, a bevel is formed on the circumferential surface of the lens on the basis of data acquired by a measurement method described earlier, wherefore the position of the bevel can be finished with good precision.

A 21st invention is the 19th invention, wherein, after the circumferential surface machining, a groove is machined in the circumferential surface using the acquired data.

With the 21st invention, a groove is formed in the circumferential surface of the lens on the basis of data acquired by a measurement method described earlier, wherefore the position of the groove can be finished with good precision.

A 22nd invention is any one of the 19th to 21st inventions, wherein, after the circumferential surface machining, the edges where the lens faces and the lens circumferential surface intersect are chamfered using the acquired data.

With the 22nd invention, the edges where the lens faces and the lens circumferential surface intersect are chamfered on the basis of data acquired by a measurement method described earlier, wherefore the chamfered bevels can be finished with good precision.

BRIEF DESCRIPTION OF THE DRAWINGS

FIG. 4 is a plan representing the detailed configuration of a lens holding unit in a lens machining apparatus in an embodiment of the present invention;

FIG. 5(a) is a plan representing the detailed configuration of a cutting (edging) action mechanism in a lens machining apparatus in an embodiment of the present invention, while

FIG. 9(a) is a theoretical configuration diagram of a measurement head in a lens machining apparatus in an embodiment of the present invention, FIG. 9(b) is a side elevation representing the details of the forward end of a stylus, and FIG. 9(c) is a front elevation of the same;

FIG. 18(a) is an enlarged diagram used in describing cases of performing groove cutting (edging) and chamfering with an end mill in a lens machining apparatus in an embodiment of the present invention, while

FIG. 24 is a table giving actual examples of parameters determined according to different types of machining processes (where cutter turning speed=tool turning speed, and lens holding shaft turning speed=feed speed);

FIG. 25 is a graph plotting the relationship between the maximum material thickness of a lens and the number of cutting (edging) revolutions (number of machining revolutions), in terms of experimentally determined results, in a case where machining of a prescribed precision is possible without shaft displacement or the like;

FIG. 27(a) is a diagram of machining processes that can be selected with a lens machining apparatus in an embodiment of the present invention, while

1 . . . lens, 12 . . . lens holding unit, 121 . . . lens holding shaft, 121a . . . lens holder receptacle, 122 . . . lens pressing shaft, 122a . . . lens presser, 123 . . . air cylinder, 13 . . . cutter turning mechanism (circumferential surface edging apparatus), 131 . . . cutter (revolving edging tool), 14 . . . end mill turning mechanism (groove machining apparatus, chamfering apparatus), 141 . . . end mill (revolving tool), 15 . . . measurement unit, 16 . . . measurement head, 161, 162 . . . styluses, 19 . . . lens holder, 992 . . . air jet nozzle (air jetting apparatus), 993 . . . cleaning port (suction removal device).

BEST MODE FOR CARRYING OUT THE INVENTION

Figure 1:
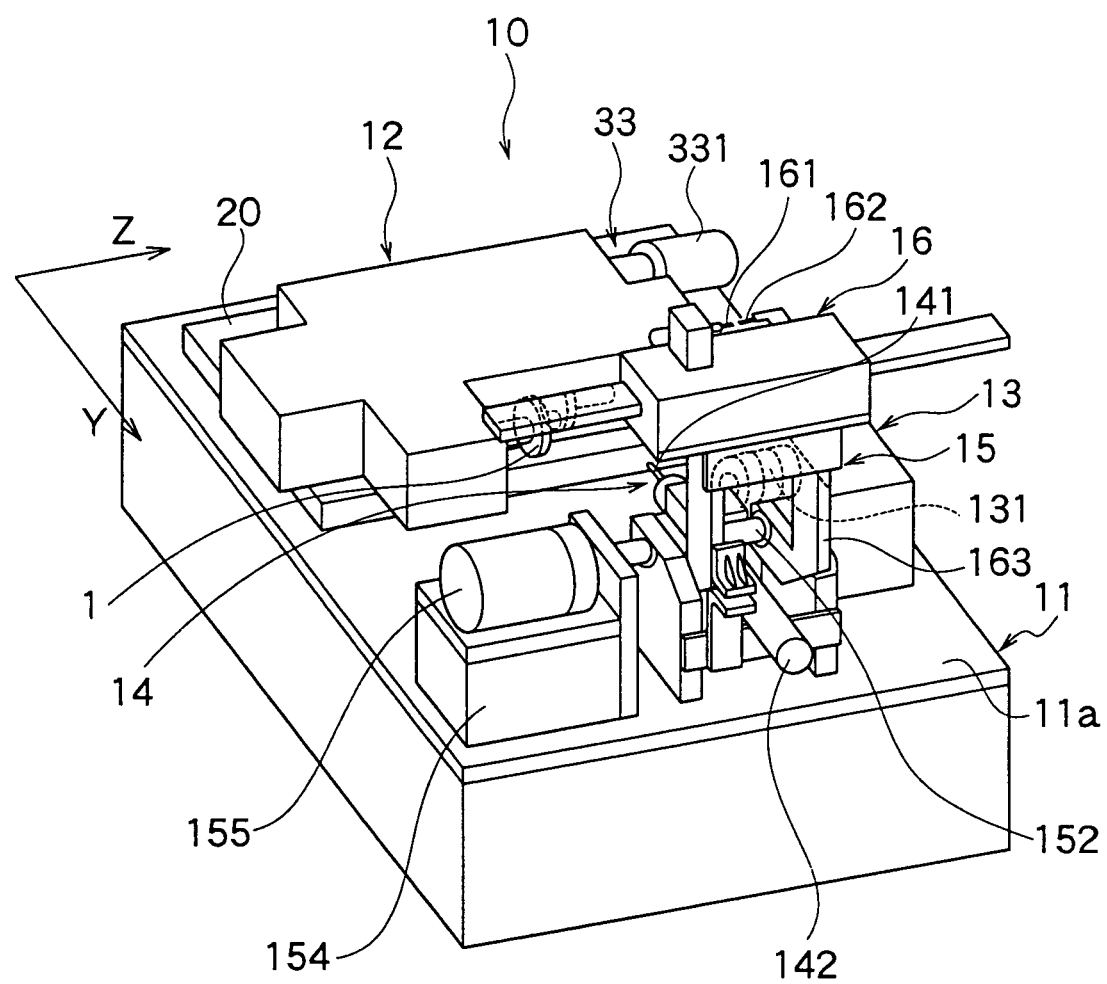
FIG. 1 is a perspective view representing the overall configuration of a lens machining apparatus in an embodiment of the present invention.
Figure 2:
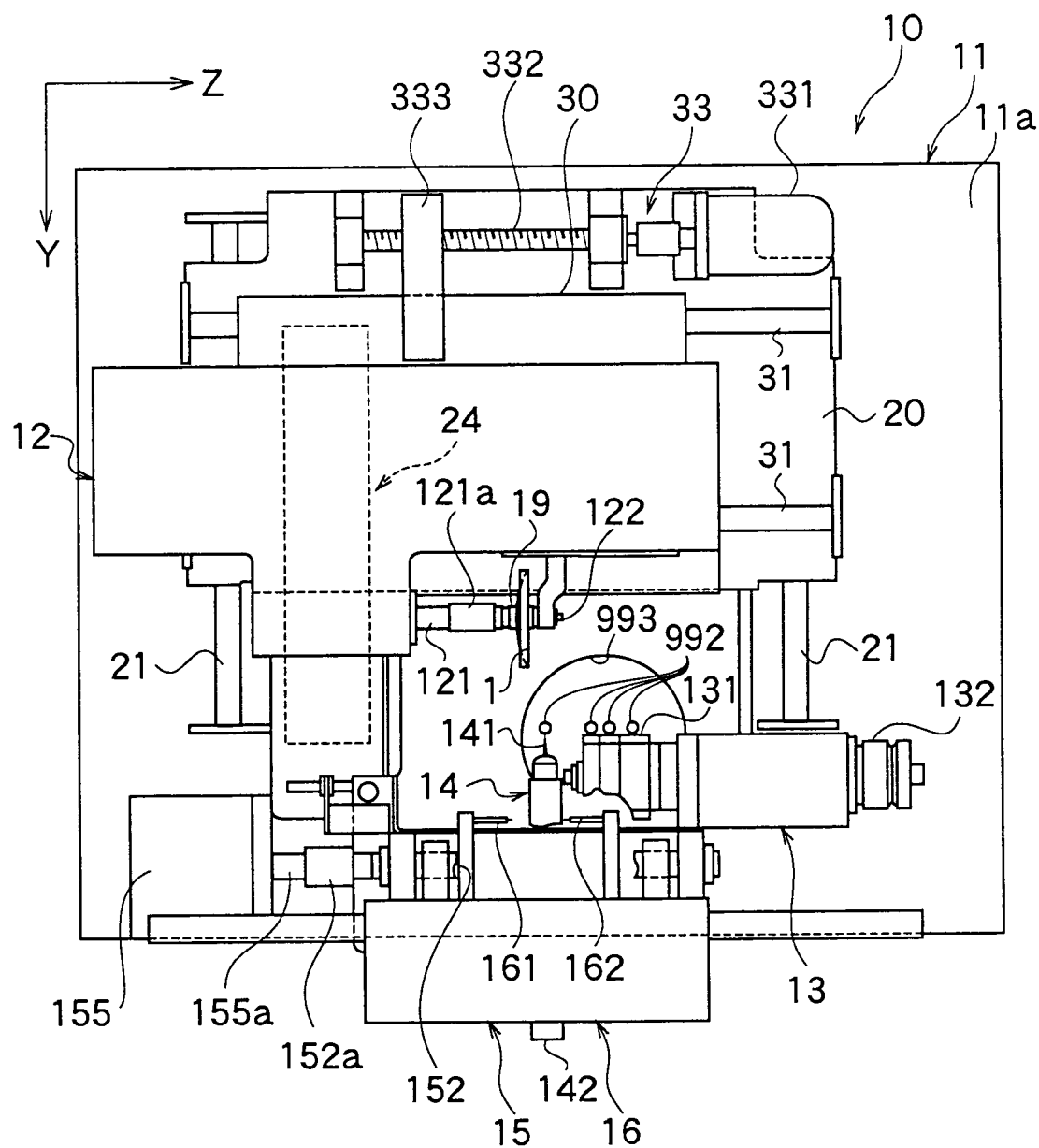
FIG. 2 is a plan representing the overall configuration of a lens machining apparatus in an embodiment of the present invention.
Figure 3:
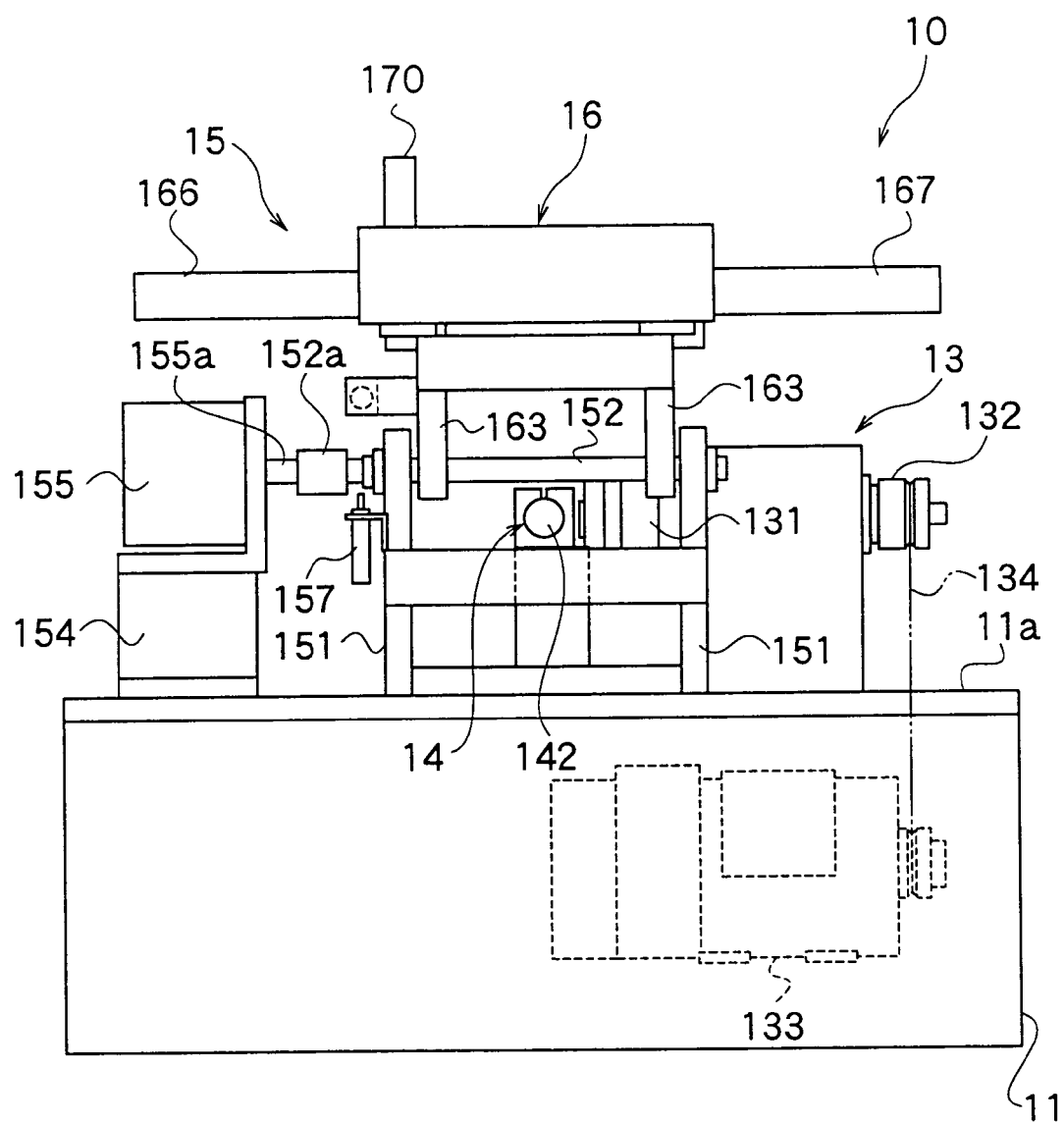
FIG. 3 is a front elevation representing the configuration of a lens machining apparatus in an embodiment of the present invention.

FIG. 1 is a perspective view of the overall configuration of a lens machining apparatus in an embodiment; FIG. 2 is a plan view of that overall configuration; and FIG. 3 is a front view of that overall configuration as seen from the front side of the apparatus. A lens machining apparatus and lens machining method pertaining to an embodiment of the present invention are described below while referencing these drawings. The lens machining apparatus relating to this embodiment, moreover, is not a grinding (edging) type that grinds (edges) a lens circumferential surface with a grindstone, as has been common conventionally, but rather a cutting (edging) type machining apparatus that forcibly cuts (edges) a lens circumferential surface with a revolving cutting (edging) tool. This type of cutting (edging) lens machining apparatus is particularly effective for plastic lenses, and machining efficiency can be enhanced therewith.

In these drawings, a machining apparatus 10 is configured by the attachment of several mechanisms to a base 11. The base plate 11a of the base 11 is deployed horizontally. On that base plate 11a are deployed a lens holding unit 12, a cutter turning mechanism 13 for performing lens circumferential surface cutting (edging), and an end mill turning mechanism 14 for performing groove machining and chamfering. These mechanisms are laid out on the base plate 11a in more or less the same plane, with the cutter turning mechanism 13 and the end mill turning mechanism 14 both deployed on the front side of the apparatus and the lens holding unit 12 deployed more to the back side of the apparatus.

A measurement unit 15 is also deployed on the base plate 11a. The measurement unit 15 has a measurement head 16 that is a lens shape measuring device. This measurement head 16 is deployed in the open space above the cutter turning mechanism 13 and the end mill turning mechanism 14 in order to avoid interference with the cutter turning mechanism 13 and the end mill turning mechanism 14.

The lens holding unit 12, while holding a lens being machined 1, also causes the lens being machined 1 to revolve about the center of the lens in order to move the machining position in the circumferential direction of the lens. The cutter turning mechanism 13 has a cutter (revolving edging tool) 131 for forcibly cutting (edging) the circumferential edge of the lens being machined 1, and performs flat cutting (edging) and bevel cutting (edging) on the circumferential surface of the lens being machined 1 by causing the cutter 131 to revolve horizontally about a shaft. The end mill turning mechanism 14 has a ball end mill 141 (hereinafter simply "end mill") as a machining tool and, by causing that end mill 141 to revolve about a horizontal shaft, forms grooves in the circumferential surface of the lens 1 (these grooves are for passing a thread of nylon or the like when mounting the lenses in a rimless frame), and chamfers the edges where the lens faces and the circumferential surface of the lens being machined 1 intersect. The measurement unit 15 has a measurement head 16 for measuring the edge thickness of the lens 1 and the lens position in the direction of edge thickness, and is capable of turning the measurement head 16 in up and down directions as necessary.

The lens holding unit 12 is deployed so that it can, by a mechanism to be described below, slide in a direction parallel to the plane of the base plate 11a and perpendicular to the shaft of the cutter 131 (that direction hereinafter called the Y axis direction), and so that it can slide in a direction parallel to the plane of the base plate 11a and parallel to the shaft of the cutter 131 (that direction hereinafter called the Z axis direction).

The cutter turning mechanism 13 is fixed on the base plate 11a. The cutter 131 of the cutter turning mechanism 13 is attached to a spindle 132, and, by transmitting the turning of a cutter turning motor 133 by a belt 134 to the spindle 132, it is caused to revolve about its own shaft centerline.

On the base plate 11a is deployed a cutting-in action mechanism 24. This cutting-in action mechanism 24 (which is equivalent to a machining action mechanism) is a mechanism that moves the lens holding unit 12 in the Y axis direction and subjects the lens 1 to a cutting-in action on the cutter 131 or end mill 141.

On the lower side of the base plate 11a is deployed a duct (not shown) configuring an apparatus for sucking out the machining dust. This duct is connected to a cleaning port 993 opened in the base plate 11a. Above this cleaning port 993 is deployed a plurality of air jet nozzles 992 comprising an air jetting apparatus. These air jet nozzles 992 are deployed in the vicinity of the cutter 131 and the end mill 141 so that the machining dust is blown by the air jet nozzles 992 when circumferential surface cutting (edging), groove cutting (edging), or chamfering machining operations are being performed on the lens being machined 1 loaded in the lens holding unit 12, and so that the blown machining dust is sucked in and removed from the cleaning port 993.

The mechanisms of the lens machining apparatus 10 are electrically controlled by control devices (not shown), which are described subsequently, deployed below the base plate 11a, for example.

On the base plate 11a of the base 11 is deployed a Y table 20 that moves in the Y axis direction. This Y table 20 is deployed so that it can slide on two parallel rails 21 and 21 that are fixed to the base plate 11a so as to be oriented in the Y axis direction. The Y table 20 is also linked to the cutting-in action mechanism 24, described above, and is controlled by the cutting-in action mechanism 24 so that it moves in the Y axis direction.

On the upper surface of the Y table 20 are fixed two rails 31 and 31 so as to be oriented in the Z axis direction. On these rails 31 and 31 is deployed a Z table 30 slidably. The Z table 30 is controlled so that it moves by a Z table movement mechanism 33 (an axial direction movement mechanism that moves the lens in that axial direction) that is fixed on the Y table 20. The Z table movement mechanism 33 is provided with a Z axis motor 331. To the turning shaft of the Z axis motor 331 is linked a ball screw 332. A slide block 333 secured to the Z table 30 is screwed onto the ball screw 332. The Z axis motor 331 can move in both the forward and reverse directions according to instructions from a control device described subsequently.

By the turning of the Z axis motor 331, the ball screw 332 also turns. When the ball screw 332 turns, the slide block 333 is moved, and the Z table 30 that is made moves, integrally with the slide block 333, along the rails 31 and 31. On the upper surface of the Z table 30 is fixed the lens holding unit 12.

FIG. 4 is a plan view showing the detailed configuration of the lens holding unit 12.

The lens holding unit 12 has a lens holding shaft 121 that is parallel to the shaft of the cutter 131 (cf. FIG. 2). The lens holding shaft 121 is made to turn by a turning mechanism inside the lens holding unit 12. At the forward end of the lens holding shaft 121 is fixed a lens holder receptacle 121a. A lens holder 19 to which the lens being machined 1 is secured is attached to the lens holder receptacle 121a so that it can be freely detached.

To the lens holding unit 12 is attached a lens pressing shaft 122 (which is also called a lens holding shaft), coaxially with the lens holding shaft 121, capable of sliding in the direction of the lens holding shaft 121 by an arm 122b. The lens pressing shaft 122 moves toward the lens 1, acted on by air pressure from an air cylinder 123, presses against the lens 1 with a lens presser 122a, and thus holds the lens 1 between itself and the lens holding shaft 121.

In this case, to the end surface (formed in a concave shape) of the lens holder 19, the convex side lens face 1A of the lens 1 is bonded, with an intervening double-sided adhesive pad 191, and the lens presser 122a presses against the concave side lens face 1B of the lens 1. The lens presser 122a is attached to the forward end of the lens pressing shaft 122 so that it can be tilted in any direction, made so that it presses against the concave side lens face 1B of the lens 1 in a balanced manner without striking on only one side.

The air cylinder 123 provided inside the case 12a of the lens holding unit 12 causes the rod 123a thereof to move in the Z axis direction by the pressure of air sent from an air pump (not shown) provided externally. To the forward end of the rod 123a is secured an arm 123b, deployed so that it moves integrally with the rod 123a. To the arm 123b are secured a guide table 123c and the arm 122b of the lens pressing shaft 122. The lens pressing shaft 122 is deployed so that it can move along a long hole 12b that is formed in the case 12a so as to extend in the Z axis direction. At the forward end of the lens pressing shaft 122, the lens presser 122a is deployed so that it can turn freely forwards or backwards about the Z axis.

The guide table 123c is fit, so that it can slide, onto a rail 124a, deployed on a side surface of a rail platform 124 so that it is parallel to the Z axis direction. As a consequence, when the rod 123a of the air cylinder 123 moves, the arm 123b, guide table 123c, and lens pressing shaft 122 move in the Z axis direction integrally therewith, and the lens presser 122a presses against or separates from the lens 1.

A lens turning motor 125 is deployed inside the case 12a. To the shaft 125a of this lens turning motor 125 is linked a small-diameter gear 125c through a coupling 125b. The gear 125c is linked to a large-diameter gear 125d. And to the gear 125d is provided a pulley 125e. This pulley 125e is linked by a belt 125f to a pulley 121b fixed on the shaft 121.

Thus, when the lens turning motor 125 is driven, the turning of the shaft 125a is transmitted to the coupling 125b and the gear 125c, and is speed-reduced by the gear 125d. This speed-reduced turning is transmitted by the pulley 125e, belt 125f, and pulley 121b to the lens holding shaft 121, whereupon the lens 1 turns.

To the lens holding shaft 121 is secured a slit plate 121c. The turning position of this slit plate 121c is detected by a light sensor 126 fixed inside the case 12a, and thereby the position of the point of origin of the lens 1 held by the lens holding shaft 121 is detected.

With the lens holding unit 12 configured in this way, when the lens 1 is secured to the lens holder receptacle 121a, the air cylinder 123 drives and the lens pressing shaft 122 moves toward the right in the drawing. Thereupon, the lens 1 is secured by the pressing of the lens presser 122a on the lens 1. When the lens 1 is being machined and when lens measurements are being made, the lens turning motor 125 drives, the lens holding shaft 121 turns, and the lens 1 is turned thereby. Also, by the turning of the lens 1, the lens presser 122a also turns integrally therewith.

Figure 5A:
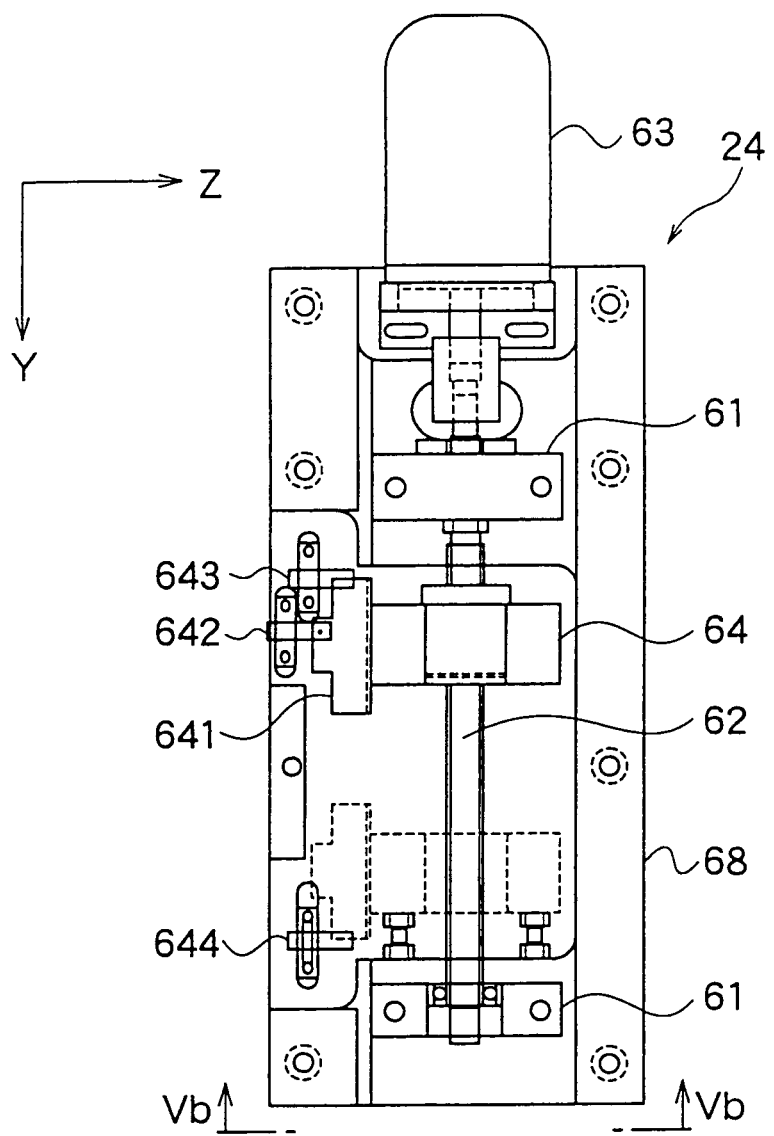
Figure 5B:
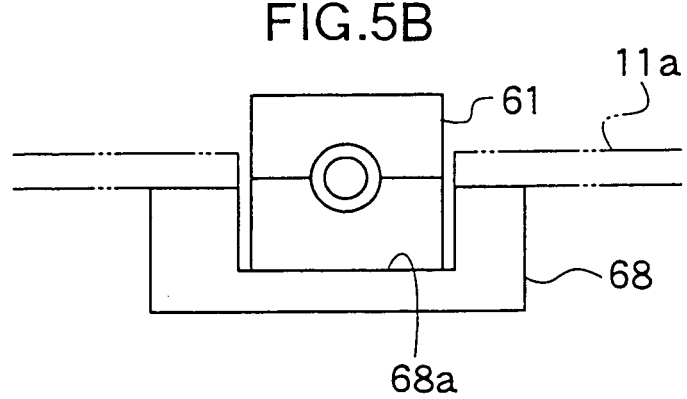
FIG. 5(b) is a view from the Vb—Vb arrows in FIG. 5(a)

FIG. 5(a) is a plan that in simplified form represents the configuration of the cutting-in action mechanism 24 as a Y-axis-direction movement mechanism, while FIG. 5(b) is a view from the Vb—Vb arrows in FIG. 5(a). The cutting-in action mechanism 24 is secured to the upper surface of a concave part in a concave member 68 that is attached to the lower surface at an opening in the base plate 11a. On the upper surface of the concave part of the concave member 68 are deployed two bearing support members 61 and 61, at an interval. To these support members 61 and 61 is attached a bore screw 62 oriented in the Y axis direction so that it can turn freely. One end of the bore screw 62 is linked to the shaft of a cutting-in motor 63 that is secured to the concave member 68.

The cutting-in motor 63 turns in both the forward and reverse directions, according to instructions from a control device to be described subsequently, and the bore screw 62 turns in linkage with the turning of this cutting-in motor 63. A moving block 64 is screwed onto the bore screw 62, and the moving block 64 is linked to the Y table 20 described earlier. Thus the Y table 20 and the lens holding unit 12 move in the Y axis direction, integrally with the moving block 64 in the cutting-in action mechanism 24. Thus cutting-in operations are performed by the lens 1 against the cutter 131.

To the moving block 64 is attached a switch piece 641. This switch piece 641 turns on a light sensor 642 secured to the concave member 68 when the moving block 64 is in a point of origin position that constitutes a reference for cutting-in amount measurement. When the moving block 64 is at one of the limiting positions, a light sensor 643 secured to the concave member 68 turns on. And when the moving block 64 is at the other limiting position, a light sensor 644 secured to the concave member 68 turns on.

Next, the end mill turning mechanism 14 is described. The end mill turning mechanism 14 is deployed adjacent to the cutter 131 of the cutter turning mechanism 13, secured to the top of the base plate 11a, oriented in a direction so that the axis of the end mill 141 is perpendicular both to the lens holding shaft 121 and the lens pressing shaft 122 of the lens holding unit 12, and parallel to the base plate 11a. Furthermore, the axis of the end mill 141, the axis of the cutter 131, the lens holding shaft 121, and the lens pressing shaft 122 are positioned at the same height. The end mill turning mechanism 14 is provided with a spindle motor 142 that drives the end mill 141 so that it turns.

Figure 7A:
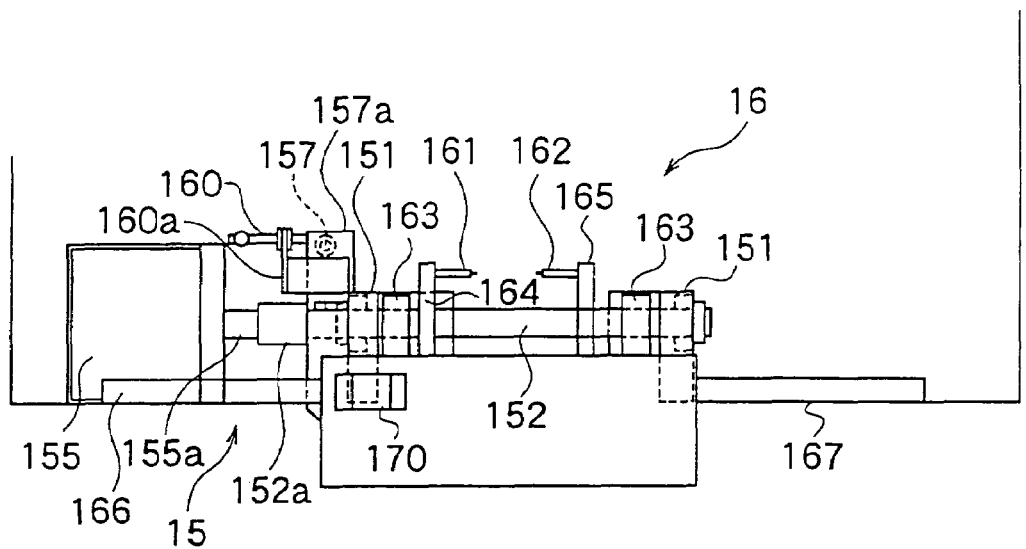
FIG. 7 is a plan of a measurement unit in a lens machining apparatus in an embodiment of the present invention, showing the condition thereof with a measurement head in an unloaded position at (a) and the condition with the measurement head loaded at (b)
Figure 7B:
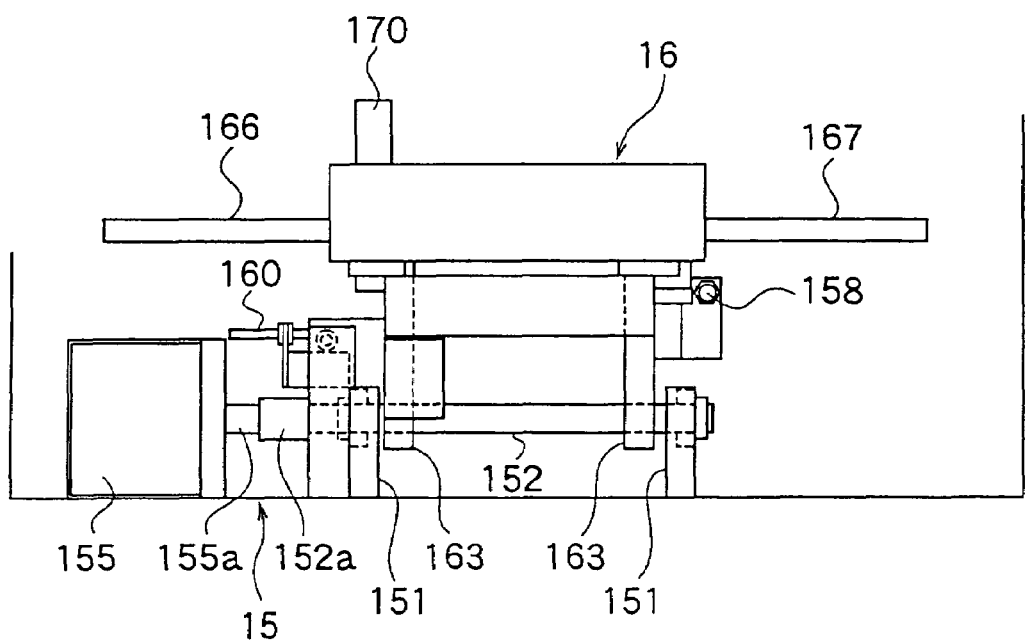
Figure 8:
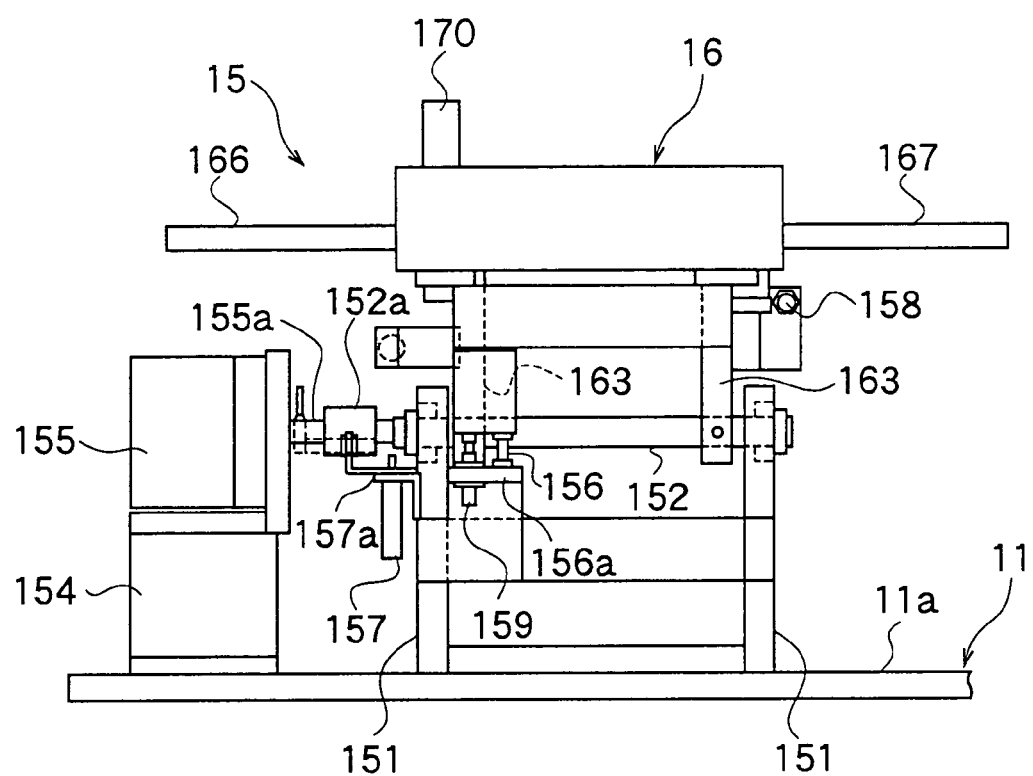
FIG. 8 is a front elevation of a measurement unit in a lens machining apparatus in an embodiment of the present invention.

Next, the measurement unit 15 is described with reference to FIGS. 6 to 8.

Figure 6A:
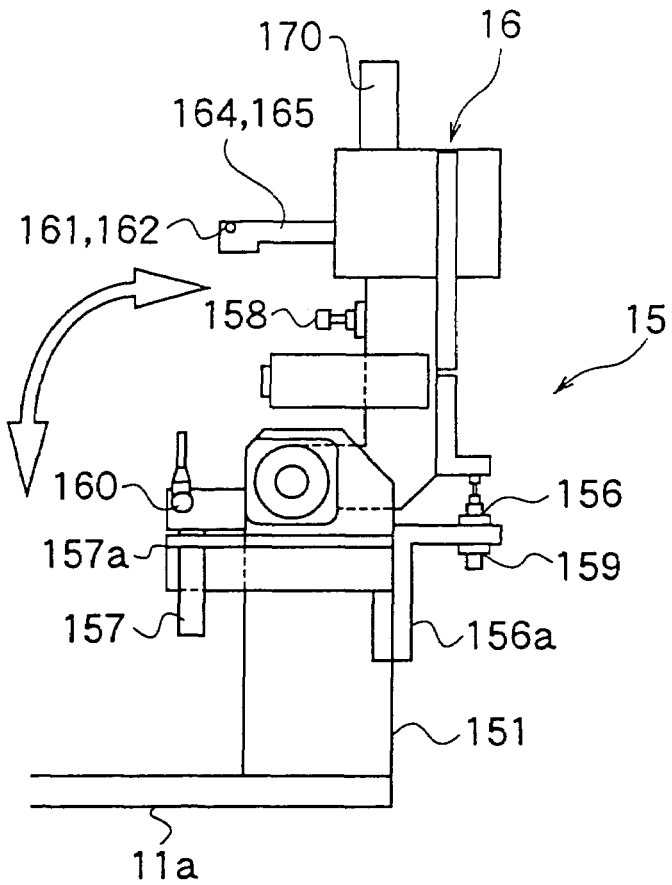
FIG. 6 is a side elevation of a measurement unit in a lens machining apparatus in an embodiment of the present invention, showing the condition thereof with a measurement head in an unloaded position at (a) and the condition with the measurement head loaded at (b)
Figure 6B:
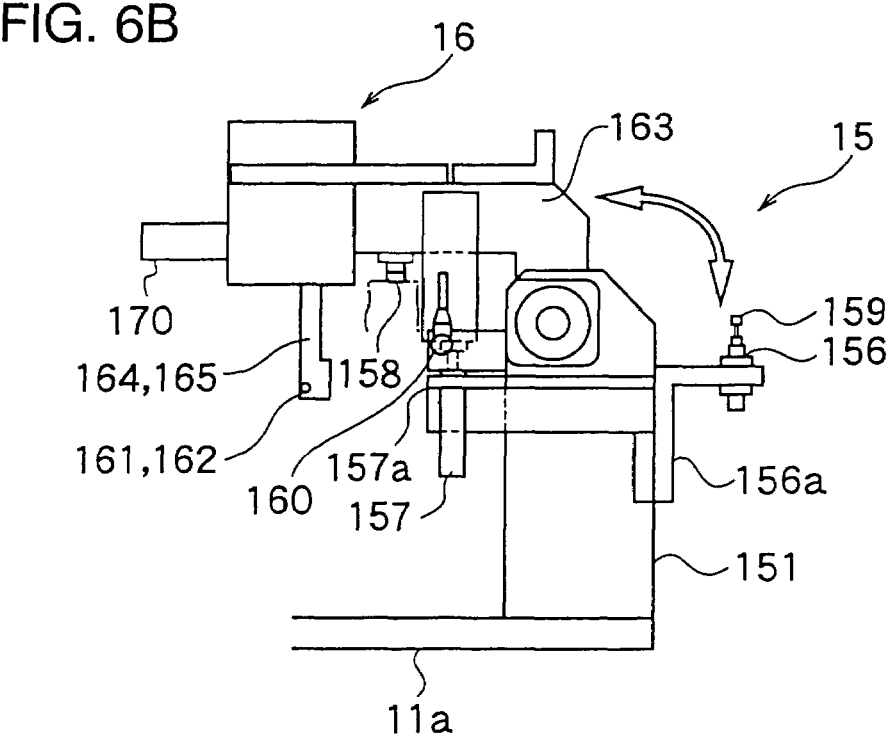

The measurement unit 15 has a measurement head 16 that is provided with a pair of styluses 161 and 162. As diagrammed in FIG. 8, the measurement head 16 is attached by a turning shaft 152 to two supporting walls 151 and 151 erected at an interval on the base plate 11a. The turning shaft 152 is deployed so as to be parallel with the shaft of the cutter 131, supported so that it can turn in the up and down directions at a height near the upper ends of the supporting walls 151 and 151. To the turning shaft 152 are secured two arms 163 and 163 that project downward from the measurement head 16. Provision is thereby made so that, by turning the turning shaft 152, the measurement head 16 turns between an unloaded position (holding position when not being used in measuring) as indicated in FIG. 6(a) and FIG. 7(a) and a loaded position (position when being used in measuring) as diagrammed in FIG. 6(b) and FIG. 7(b).

One end of the turning shaft 152 protrudes from one of the supporting walls 151 in the horizontal direction. This protruding end is linked through a coupling 152a to the turning shaft 155a of an air drive type measurement head turning actuator 155 that is secured by a frame 154 on the base plate 11a. The measurement head 16 is moved to the unloaded position and to the loaded position by the air drive type measurement head turning actuator 155, wherefore, stoppers 156 and 157 are deployed so that the measurement head 16 definitely stops in the unloaded position and in the loaded position (cf. FIG. 6). The stoppers 156 and 157 are deployed on non-moving members, that is, on brackets 156a and 157a secured to the supporting wall 151. The configuration is such that the measurement head 16 is positioned by having certain places on the measurement head 16 strike these stoppers 156 and 157.

The stopper 156 on the unloaded position side does not need to exhibit a particularly accurate positioning function, but the stopper 157 on the loaded position side affects the precision of measurement by the measurement head 16, and therefore must exhibit an extremely accurate positioning function. For that reason, a microhead ($\frac{1}{1000}$ mm) capable of adjusting the positioning position precisely is used for the stopper 157 on the loaded side. By positioning with this microhead type of stopper 157, the styluses 161 and 162 of the measurement head 16 moved to the loaded position are accurately held at the same height level as the turning center of the lens holding shaft 121 and the turning center of the cutter 131. The configuration is made so that deviations in the initial positioning can be adjusted.

When the measurement head 16 has been moved to the unload d position or to the loaded position by the turning actuator 155, there is a danger that a shock will occur when the certain places on the measurement head 16 strike the stoppers 156 and 157, wherefore, shock absorbers 158 and 159 that exhibit a shock absorbing action are deployed on the arm 163 of the measurement head 16 and on the bracket 156a secured to the supporting wall 151. These shock absorbers 158 and 159 exhibit a shock reducing action when they strike members on the respective sides immediately before the measurement head 16 strikes the stoppers 156 and 157, thereby playing a role to soften the impact of the measurement head 16 against the stoppers 156 and 157.

Also, when the measurement head 16 is moved to the loaded position, it is necessary to verify that the measurement head 16 has fallen into the loaded position, wherefore, as diagrammed in FIGS. 6 and 7, a light sensor 160 is deployed in a bracket 160a secured to the supporting wall 151, on the loaded position side, so that the presence or absence of the measurement head 16 there can be detected.

By being configured in this way so that it can turn between the loaded position and the unloaded position, provision is made so that the measurement head 16 can be delivered from above to the position where measurement is to be done (the loaded position), when needed, and removed to a holding position above (the unloaded position) when not needed. Accordingly, by mounting the measurement head 16 in this manner so that it does not interfere with the work done by the cutter 131 or end mill 141, once the lens 1 is held by the lens holding unit 12, everything from measurement to machining can be done without unchucking the lens 1, so that work can be moved along with a single chucking. Furthermore, in special cases, when effecting measurements as necessary during the course of machining the lens 1, the edge thickness and so forth of the lens 1 can be measured, with the lens 1 held just as it is, without releasing the chucking on the lens 1.

A concrete configuration of the measurement head 16 is described next. As diagrammed in FIG. 2 and FIG. 7(a), for example, the measurement head 16 is provided with a pair of styluses (measuring probes) 161 and 162 that make contact with the convex side lens face and the concave side lens face of the lens being machined 1 that is held by the lens holding unit 12. These two styluses 161 and 162 are positioned on a straight line parallel to the thickness dimension of the lens (in a direction parallel with the turning shaft 152), deployed so that the spherical tips thereof are in mutual opposition.

FIG. 9(a) is a diagram that represents the theoretical configuration of the measurement head 16, while FIGS. 9(b) and 9(c) are diagrams that represent the configuration of the tip end of the stylus 161.

The styluses 161 and 162 are attached to arms 164 and 165 that are moved in parallel by guiding mechanisms (not shown). The stylus 161 (with the other stylus 162 having the same configuration), as diagrammed in detail in FIGS. 9(b) and 9(c), is structured such that a perfectly spherical steel ball (being a steel ball made of super hard steel of 2ϕ or so that is highly resistant to wear and shape deformation) 161b is attached to the tip of a rod-shaped stylus trunk 161a. A flat surface is formed on the side surface of the stylus trunk 161a, and the steel ball 161b is attached eccentrically to the stylus trunk 161a toward that flat surface side.

In this case, one might naturally first consider attaching the steel ball in the very middle of the stylus trunk. When that is done, however, there is a great danger of the steel ball being attached at a position that is actually shifted away from the center due to attachment error or machining error, whereupon stylus center coordinate shift correction becomes difficult. Thereupon, if a flat surface is formed on a side surface of the stylus trunk 161a as described earlier, and the steel ball 161b is attached so that the outer circumference of the steel ball 161b touches the extended plane of the flat surface, the position of the center of the steel ball 161b will be located at a distance from the flat surface of the stylus trunk 161a that is equal to the radius thereof. Accordingly, it becomes possible to ascertain the positional coordinates of the center of the steel ball 161b accurately, and that can be reflected in the measurements.

The arms 164 and 165 to which such styluses 161 and 162 are attached move in parallel, whereby the interval between them opens and closes. The arms 164 and 165 are linked to movable probes 166b and 167b in linear encoders 166 and 167 inside of which are deployed springs (contracted springs in the example diagrammed) 166a and 167a, and are energized in the closed condition by the springs 166a and 167a. The linear encoders 166 and 167 are devices which electrically detect the moving positions of the movable probes 166b and 167b, wherefore the positions of the styluses 161 and 162 are detected by the linear encoders 166 and 167.

As described above, the styluses 161 and 162 are energized toward the closed direction by the springs 166a and 167a so that they automatically close, and they must be moved by some driving mechanism toward the open direction. Thereupon, a belt 173 wound about a pair of pulleys 171 and 172 is deployed above the arms 164 and 165, the pulley 171 is made to turn by a stylus opening and closing DC motor 170, causing the belt 173 to go around, and thereby the arms 164 and 165 are hooked by engagement pieces 173a and 173b provided on the belt 173 and caused to move in the open direction.

Furthermore, provision is made in this case also so that it can be detected whether the styluses 161 and 162 are opened or closed by detecting the position of the engagement piece 173a with optical sensors 174 and 175. The configuration is also such that it can be detected whether or not the arms 164 and 165 are positioned at their points of origin by the optical sensors 176 and 177.

Figure 10:
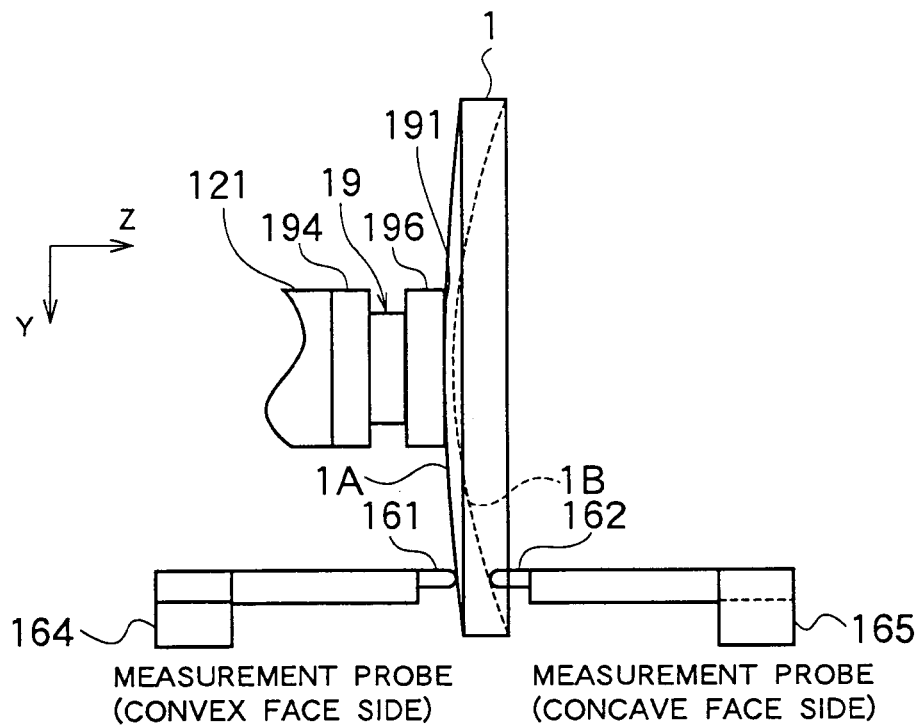
FIG. 10 is a plan representing a condition wherein the stylus of a measurement head is loaded on a lens in a lens machining apparatus in an embodiment of the present invention.
Figure 11:
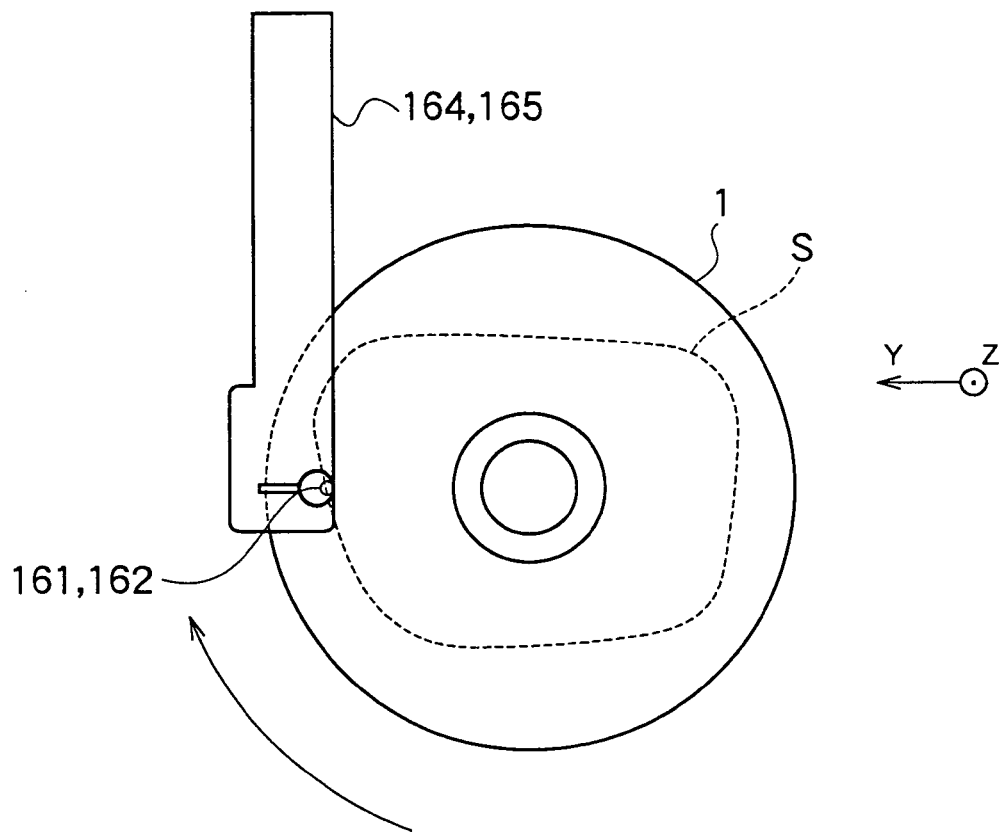
FIG. 11 is a side elevation representing a condition wherein the stylus of a measurement head is loaded on a lens in a lens machining apparatus in an embodiment of the present invention.

The principle wherewith lens positions are measured by the styluses 161 and 162 of the measurement head 16 is diagrammed in FIGS. 10 and 11. The styluses 161 and 162 oppose each other on the same straight line parallel with the lens holding shaft 121. Now, when the lens 1 is moved between the tips of the two styluses 161 and 162 in a condition wherein the styluses 161 and 162 have been opened by driving the belt 173 diagrammed in FIG. 9, and the belt 173 is returned to the opposite side, the styluses 161 and 162 are closed by the action of springs 166a and 167a in the linear encoders 166 and 167, and, as diagrammed in FIG. 10, one stylus 161 brings its tip up against the convex side lens face 1A of the lens 1, while the other stylus 162 brings its tip up against the concave side lens face 1B of the lens 1.

Now, when the lens 1 is controlled so as to move based on lens frame shape data (=shape data), the styluses 161 and 162 trace a locus S following the shape data, as diagrammed in FIG. 11.

Figure 12:
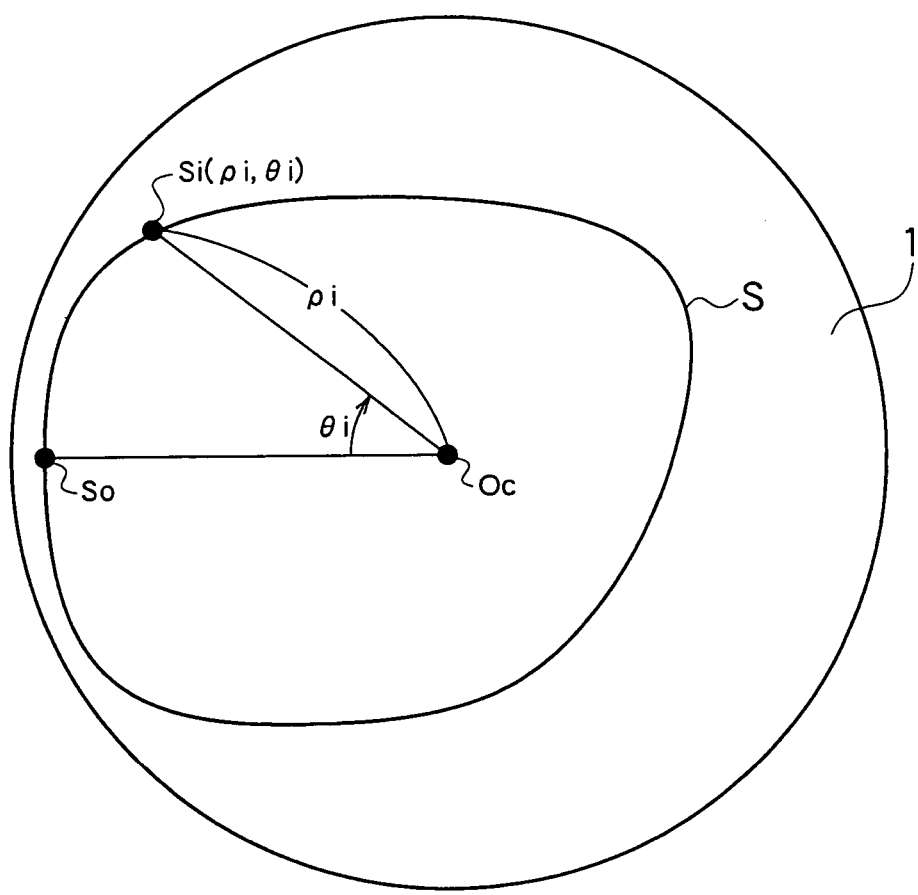
FIG. 12 is an explanatory diagram for shape data.

FIG. 12 is an explanatory diagram for shape data. In FIG. 12, the holding center point of the lens 1 held by the lens holding unit 12 is represented as Oc (set here to the optical center). When this is done, any point Si on the locus S can be expressed as moving radial information ($\rho i$, $\theta i$) that constitutes polar coordinates with Oc at the origin. Here, $\rho i$ is the distance (moving radial length) from Oc to any point Si on the locus S, while $\theta i$ is the angle (moving radial angle) subtended by the straight line OcSi with a reference line OcSo that passes through Oc. When shape data are given by a method such as this, by controlling the cutting-in action mechanism 24 to a quantity based on the moving radial length $\rho i$, the lens 1 will move in a lens radial direction relative to the styluses 161 and 162, and the styluses 161 and 162 will be positioned at a position that is removed from the center axis of the lens holding shaft 121 by the moving radial length $\rho i$. Moreover, by controlling the lens turning mechanism of the lens holding unit 12 so as to turn by an amount based on the moving radial angle $\theta i$, the lens 1 will be made to turn by precisely the moving radial angle $\theta i$ relative to the styluses 161 and 162. The tips of the styluses 161 and 162 trace over the convex side lens face 1A and the concave side lens face 1B of the lens 1, wherefore, by detecting the amount of movement in the styluses 161 and 162 with the linear encoders 166 and 167, it is possible to obtain lens position data (Zi) for the edge thickness dimension (Z axis direction) corresponding to the moving radial information. And, by performing this detection operation for all of the moving radial information ($\rho i$, $\theta i$), it is possible to obtain position data for the convex side lens face 1A and position data for the concave side lens face 1B ($\rho i$, $\theta i$, Zi), on the lens moving radial shape locus ($\rho i$, $\theta i$). Lens thicknesses (edge thicknesses) on the lens moving radial shape locus ($\rho i$, $\theta i$) can also be calculated from such position data for the convex side lens face 1A and position data for the concave side lens face 1B.

The cutter 131 of the cutter turning mechanism 13 is next described.

Figure 13A:
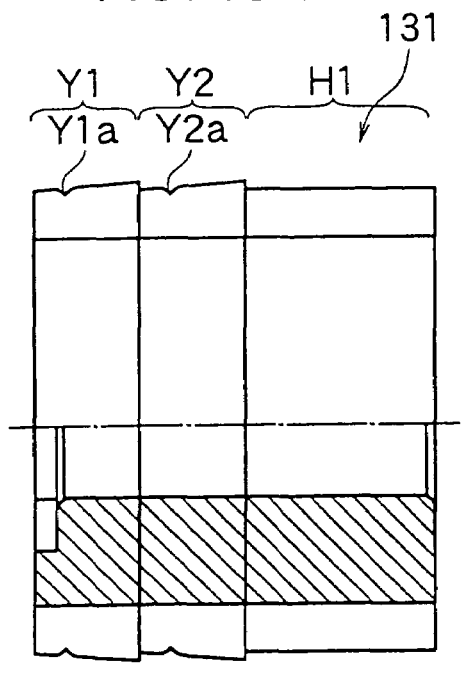
FIG. 13 represents the configuration of the cutter of a cutter turning mechanism in a lens machining apparatus in an embodiment of the present invention, with a semi-sectional view given at (a), a side elevation at (b), and an enlarged diagram of the main parts of a bevel cutter at (c)
Figure 13B:
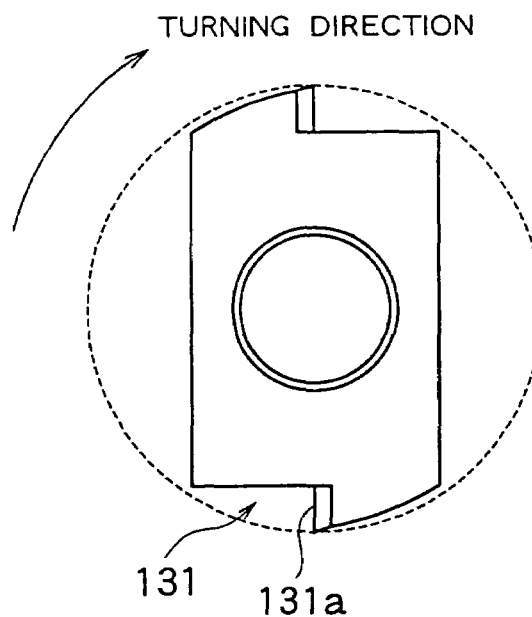

The configuration of the cutter 131 is diagrammed in FIG. 13. This cutter 131, as diagrammed in FIG. 13(b), has two cutting blades 131a of a projecting form at the outer circumferential surface thereof. The cutting blades 131a are deployed at an interval of 180 degrees in the circumferential direction. These cutting blades 131a are configured by laminated chips wherein fine crystalline diamond and a superhard alloy are bonded together by sintering under extremely high pressure. The cutter 131, as diagrammed in FIG. 13(a), has three cutters aligned on the same axis line, and linked integrally, those three cutters being a small bevel cutter Y1 having a small bevel groove Y1a (example: for metal frames), a large bevel cutter Y2 having a large bevel groove Y2a (example: for plastic cell frames), and a flat-cutting (edging) cutter H1 having no bevel groove (example: for rimless frames), configured so that the cutter parts are used in different ways depending on the machining being done.

Figure 13C:
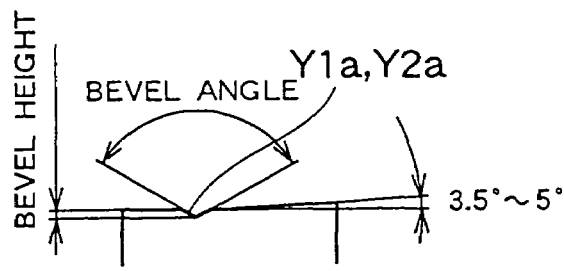

The bevel grooves Y1a and Y2a are as diagrammed in FIG. 13(c). The bevel angle is 110 to 125 degrees, for example, while the bevel height is 0.4 to 0.68 mm for the small bevel, for example, and 0.7 to 0.9 mm for the large bevel, for example. The flat surface adjacent to the bevel grooves Y1a and Y2a is tapered at an angle of 3.5 to 5 degrees, for example. This is to create clearance for the frame adjacent to the bevel.

Figure 14:
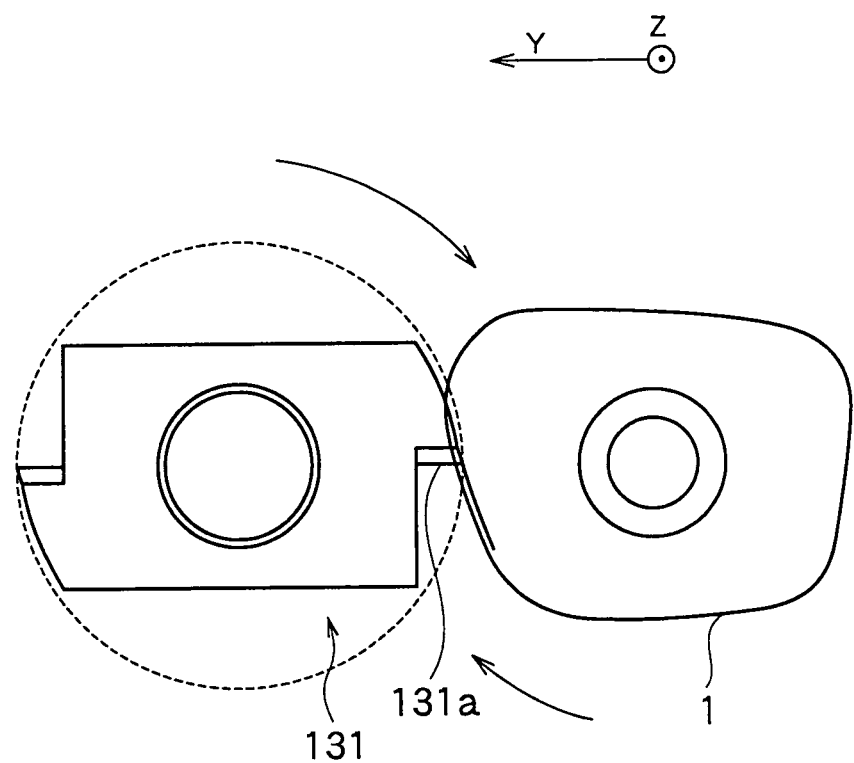
FIG. 14 is a side elevation representing the condition wherein a lens is being machined with the cutter of a cutter turning mechanism in a lens machining apparatus in an embodiment of the present invention.

The principle whereby the circumferential edge of the lens 1 is cut (edged) by the cutter 131 is described in FIG. 14.

Looking from the site of interference between the cutter 131 and the lens 1, the cutter 131 turns from above to below, while the lens 1 turns from below to above. Thereupon, at the site of interference, the cutting blade 131a of the cutter 131 forcibly cuts (edges) the lens 1 by precisely the set cutting-in amount. Now, when a machining program is produced on the basis of the lens frame shape data (=shape data), and the lens 1 is controlled so as to move according to that machining program, the cutter 131 cuts (edges) the circumferential surface of the lens 1 according to the particulars of the movement of the lens 1.

Figure 15:
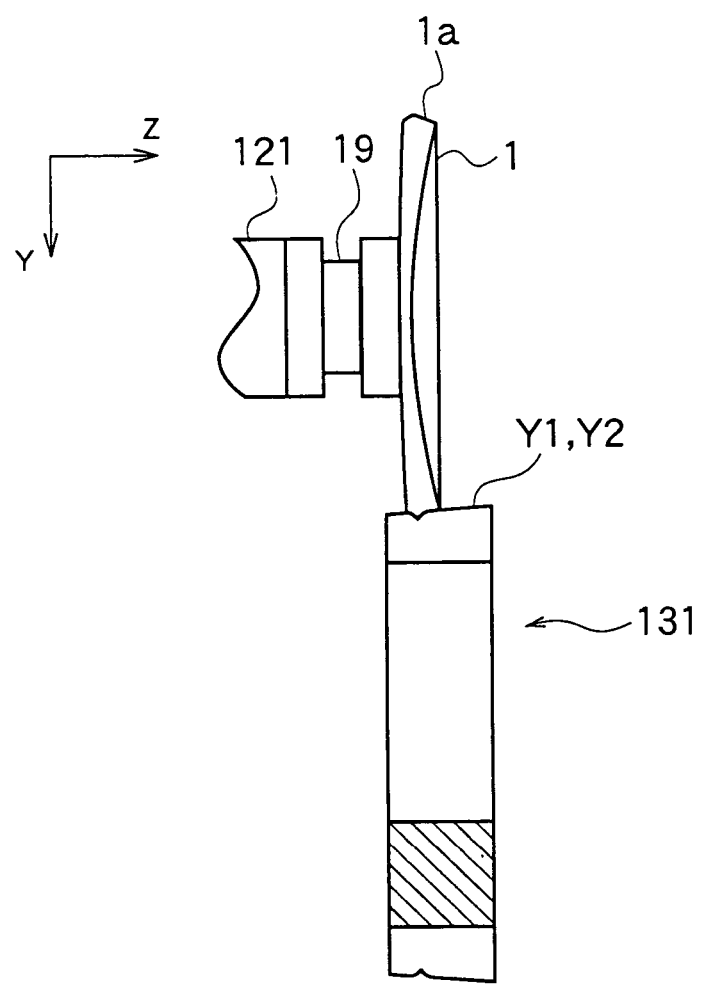
FIG. 15 is a plan representing the condition wherein a lens is being machined with the bevel cutter of a cutter turning mechanism in a lens machining apparatus in an embodiment of the present invention.
Figure 16:
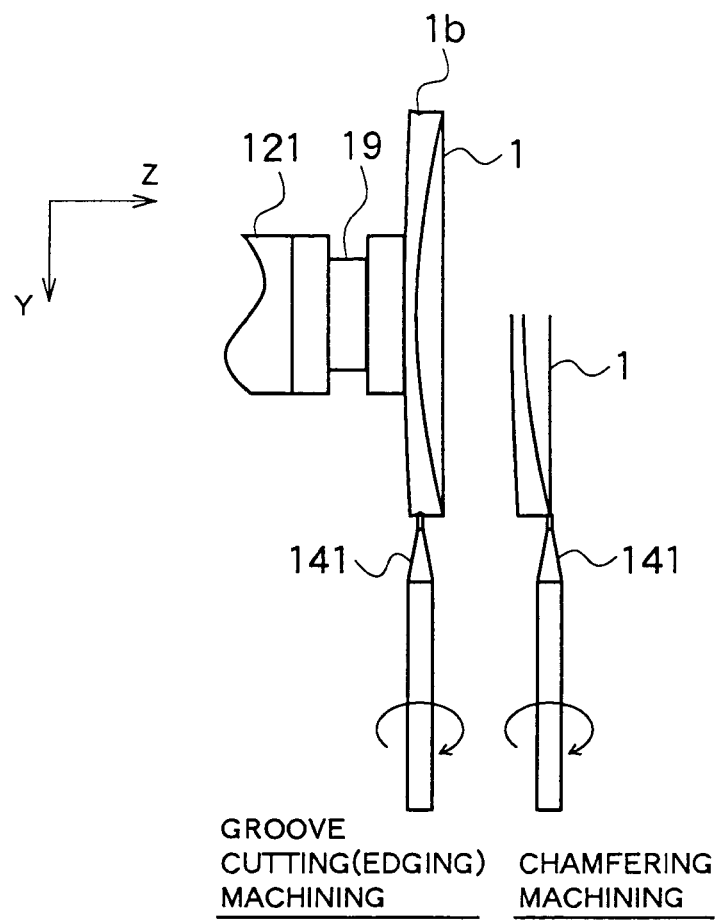
FIG. 16 is a plan representing a condition wherein an edge in a lens edge surface is being chamfered and a condition wherein a groove is being cut (edged) in a lens edge surface by an end mill in an end mill turning mechanism in a lens machining apparatus in an embodiment of the present invention.
Figure 17:
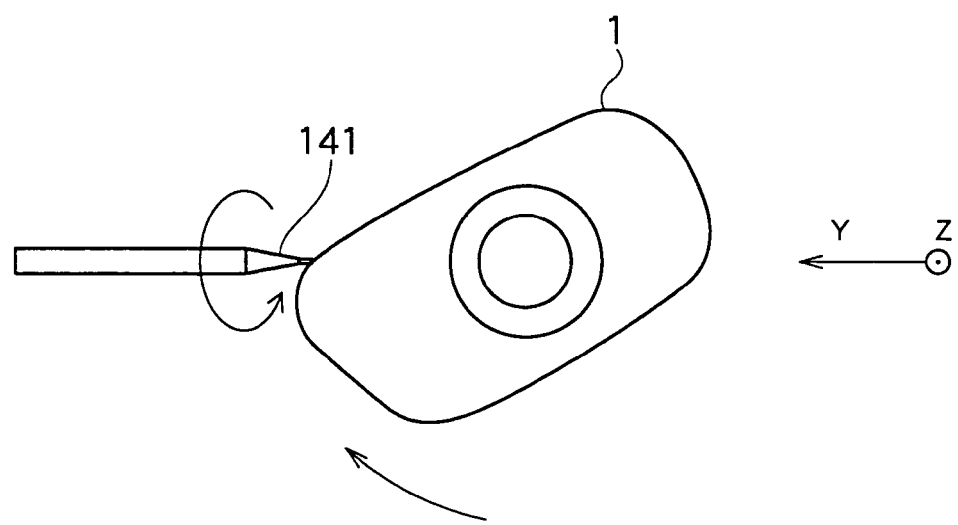
FIG. 17 is a side elevation representing a condition wherein groove cutting (edging) or chamfering is being performed by an end mill in a lens machining apparatus in an embodiment of the present invention.
Figure 18A:
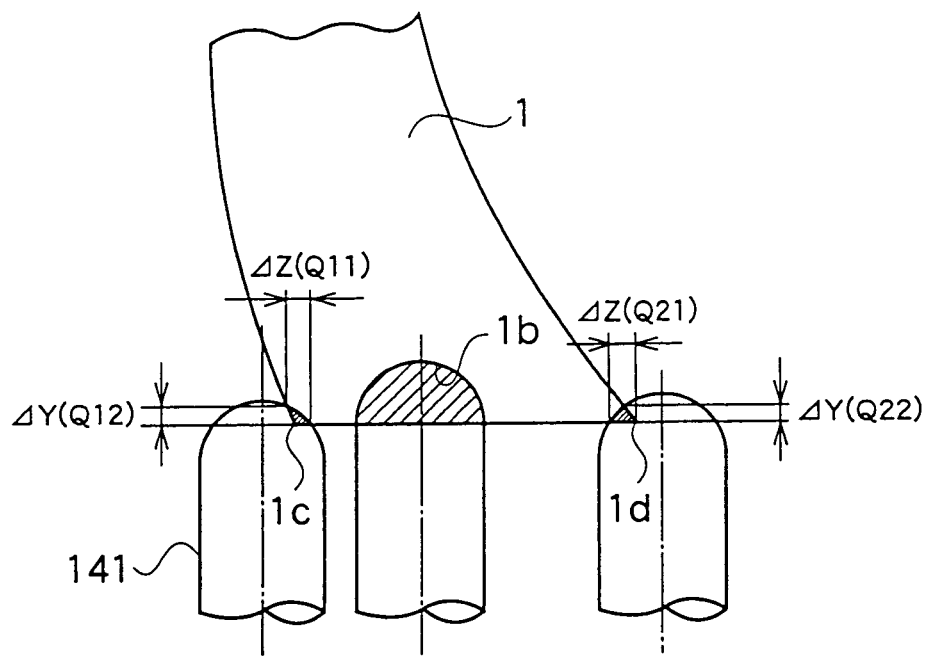
Figure 18B:
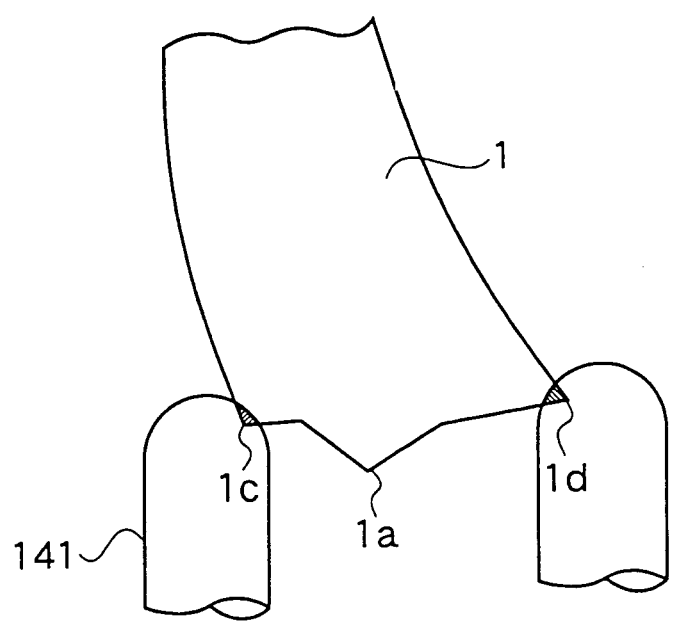
FIG. 18(b) is an explanatory diagram for chamfering when there is a bevel.
Figure 19A:
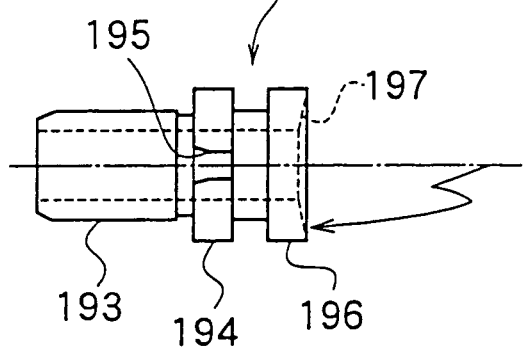
FIG. 19 is an explanatory diagram for a lens holder in a lens machining apparatus in an embodiment of the present invention, with a side elevation of the lens holder given at (a), a plan of the lens holding surface of the lens holder at (b), a cross-sectional view of minute undulations formed in the lens holding surface at (c), a cross-sectional view representing a condition wherein a pad is pressed onto those minute undulations at (d), a cross-sectional view of minute undulations formed in the lens holding surface of a conventional lens holder at (e), and a cross-sectional view representing a condition wherein a pad is pressed onto those minute undulations at (f)
Figure 19B:
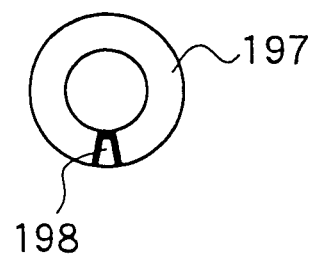
Figure 19C:
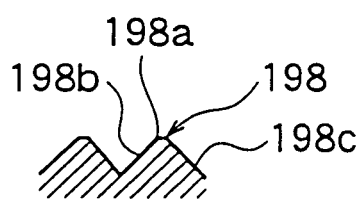
Figure 19D:
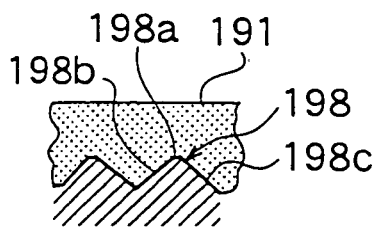
Figure 19E:
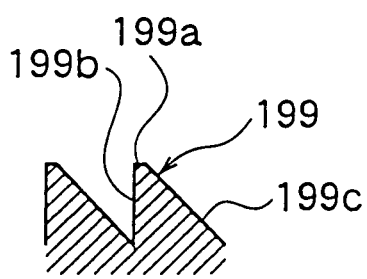
Figure 19F:
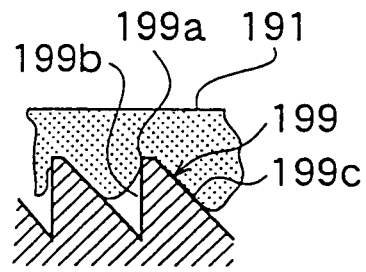

For flat cutting (edging), the lens 1 is positioned at a suitable position in front of the flat-cutting (edging) cutter H1, and machining is performed by driving the cutting-in action mechanism 24 while turning the cutter 131. For bevel edging, as diagrammed in FIG. 15, the lens 1 is positioned at a suitable position in front of the bevel cutters Y1 and Y2, and machining is performed by driving the cutting-in action mechanism 24 while causing the cutter 131 to turn, in conjunction with the movement of the Z table movement mechanism 33 in the Z axis direction. In FIG. 15, 1a indicates the bevel.

The principle whereby groove cutting (edging) and chamfering the edges at both extremities of the bevel (lens circumferential surface) are done by the end mill 141 is diagrammed in FIG. 16, FIG. 17, FIG. 18(a) and FIG. 18(b). When cutting (edging) out a groove 1b in the edge surface (circumferential surface) of a lens 1 that has been shape-machined, as diagrammed in FIGS. 16 and 17, the edge surface is made to approach the tip of the revolving end mill 141 by moving the lens 1 under control.

When that approach has been completed, the cutting-in amount is suitably set by the cutting-in action mechanism 24 while causing the lens 1 to turn. When that is done, in association with the turning of the lens 1, a groove 1b is continuously formed at a preset depth (cutting-in amount). During the machining, the distance between the position on the edge surface currently contacted by the end mill 141 and the center of the lens is computed, and control is effected to move the position in the Y axis direction of the lens 1 according to that distance, based on the shape data for the lens 1. During the machining, furthermore, the lens 1 is controlled so as to move in the Z axis direction so that, based on the shape data, the tip of the end mill 141 is always positioned either at a certain position on the edge surface, such as the position at the center of the edge surface in the width direction (edge thickness direction), or at a position removed a certain distance from the front surface of the lens (the convex side lens face 1A).

When the lens 1 is turned a full turn while continuing such control, the groove 1b is formed in the lens edge surface all around the circumference of the lens. Upon returning to its original starting point, the end mill 141 moves in a direction opposite to that of the approach and separates from the lens 1.

When performing thread chamfering to prevent cracking and chipping on the two edges of the bevel (the edges where the lens circumferential surface and lens surfaces intersect), the R part of the tip of the end mill 141 is used, as diagrammed in FIG. 18. At (a) therein is diagrammed the case where chamfering is performed after a groove 1b has been machined in the lens circumferential surface, while at (b) is diagrammed the case where chamfering is performed after a bevel 1a has been machined in the lens circumferential surface. When the edge 1c on the convex side or the edge 1d on the concave side are taken off with the tip of the end mill 141, the shoulder portion of the R part of the tip of the end mill 141 is used.

At this time, using positional coordinate data for the edges 1c and 1d, the position of the lens 1 relative to the end mill 141 is found (for chamfering). That is, the chamfer dimensions ($\Delta Z$, $\Delta Y$) are more or less determined by the shape, etc., of the edges 1c and 1d, wherefore, by entering the position of the center of the end mill 141 performing the chamfering, together with the radius of the R part thereof and the positional data for the edges 1c and 1d, into the computation, the removal quantities Q11, Q12, Q21, and Q22, which are positional correlations between the tip of the end mill 141 and the edges 1c and 1d of the lens 1, are determined. That being so, from the data of the coordinates of the center of the end mill 141 and the removal quantities Q11, Q12, Q21, and Q22, positional coordinate data for the edges 1c and 1d of the lens 1 to be controlled can be determined, and, by causing the lens 1 to move around while controlling the position of the lens 1 in the Y axis direction and the Z axis direction, based on the positional coordinate data, mutual positioning of the lens 1 and the end mill 141 for effecting proper chamfering will be effected. In other words, by moving the lens 1 in the Y axis direction and the Z axis direction and also causing it to make a revolving movement, the edges 1c and 1d to be machined can be accurately positioned relative to the R part of the tip of the end mill 141 that is being driven so as to turn at a stationary position. This is possible because the shape and position information for the end mill 141 and the position information for the lens 1 are accurately ascertained. The chamfering on the convex face side and the chamfering on the concave face side are performed independently, inclusive of the respective approaches of the lens 1 to the end mill 141.

Figure 20A:
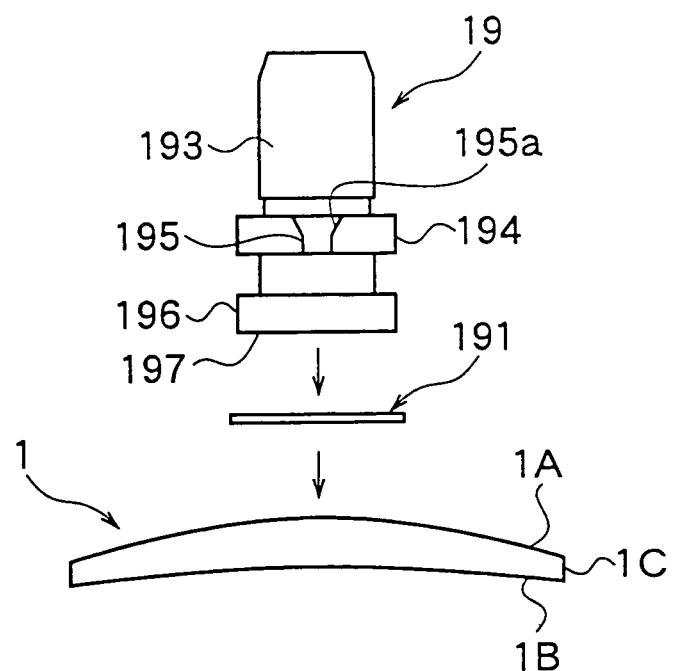
FIG. 20 is a diagram of how a lens 1 is held by a lens holder 19.
Figure 20B:
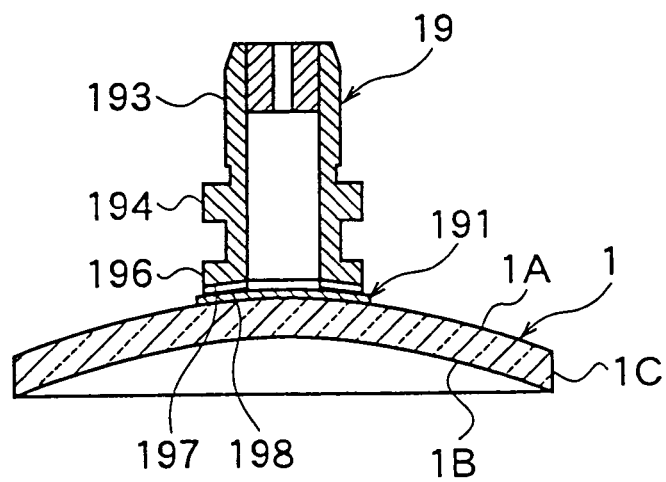

FIG. 19 is a diagram representing the configuration of the lens holder 19 used in this lens machining apparatus 10, while FIG. 20 is a diagram that shows how the lens 1 is held by the lens holder 19. As diagrammed in FIG. 19(a) and FIG. 20, the lens holder 19 is a pipe-shaped device having a fitting stem 193 that fits into the inner circumference of the tubular lens holder receptacle 121a diagrammed in FIG. 4, a fitting stem flange 194 that comes up against the end surface of the lens holder receptacle 121a, and a lens holding flange 196 that presses against the convex side lens face 1A of the lens 1 with an intervening double-sided adhesive pad 191, as diagrammed in FIG. 10 and FIG. 20. In the fitting stem flange 194 is formed a turn-stopping cutout 195 that fits a projection (not shown) on the side of the lens holder receptacle 121a. The fitting stem 193 has, for example, a length of 35 mm, an outer diameter of 14 mm $\phi$ or so, and a hole diameter in a center hole 7 of 10 mm $\phi$ or so. The fitting stem flange 194, which defines the amount whereby the fitting stem 193 fits into the lens holder receptacle 121a, has a thickness of 5 mm or so and an outer diameter of 20 mm $\phi$ or so. In the circumferential surface of the fitting stem flange 194, moreover, the turn-stopping cutout 195 is formed as a turn-preventer for preventing the lens holder 19 from turning relative to the lens holder receptacle 121a. In the part of this turn-stopping cutout 195 that is open on the side opposite that of the lens holding flange 196, a tapered surface 195a that opens toward the outside is formed in order to facilitate fitting to the lens holder receptacle 121a.

The lens holding flange 196 is deployed on the outer circumference on the forward end of the fitting stem 193, with a thickness and outer diameter that are roughly equal to those of the fitting stem flange 194, and with an interval of 5 mm or so established between it and the fitting stem flange 194. The surface of this lens holding flange 196 to which the double-sided adhesive pad 191 is bonded is made a spherically concave lens holding surface 197 corresponding to the convex side lens face 1A of the lens 1. If the radius of curvature of the lens holding surface 197 is greater than the radius of curvature of the convex side lens face 1A, only the center part of the lens holding surface 197 will make contact with the convex side lens face 1A and the outer periphery thereof will not make contact, resulting in an unstable holding, whereas, conversely, if it is smaller, only the outer periphery of the lens holding surface 197 will make contact with the convex side lens face 1A and the center part thereof will not make contact, resulting in a comparatively stable holding and making it possible to prevent axis dislocation and the like, although if it is smaller by too much then the area of contact, etc., will become small so that the holding becomes unstable. In other words, it is believed that the radius of curvature of the lens holding surface 197 should be set to a suitable size according to the radius of curvature of the convex side lens face 1A.

Here, when the lens 1 is a monofocal lens, in general the corresponding range of power will be broad, wherefore, in order to be able to select a base curve defined by the degree of curvature in the curved surface of the convex side lens face which has a curve that is suitable to the power, a number of base curves of different radiuses of curvature are established, and the curved surfaces having those established radiuses of curvature are termed ". . . curve" to specify them. In the case of a common monofocal lens, for example, 12 types are prepared, from 0 curve to 11 curve. Now, a plurality of lens groups, wherein those having similar curve constitute one group, are classified, with, for example, 0 to 3 curve in a first lens group, 4 to 6 curve in a second lens group, and 7 to 11 curve in a third lens group. In this embodiment, a lens holder 19 having a lens holding surface 197 of a different radius of curvature is prepared for each lens group, with the holder used for the first lens group of 0 to 3 curve set at 4 curve, the holder used for the second lens group of 4 to 6 curve set at 7 curve, and the holder used for the third lens group of 7 to 11 curve set at 11 curve. In other words, the lens holder 19 is made in a number of types (three types) corresponding to the number of lens groups, so as to have a lens holding surface 197 that has a smaller radius of curvature than the convex side lens face 1A of the lenses 1 belonging to each lens group (although the lens holder will have the same curve for lenses of 11 curve), so that outside contact is made with the convex side lens face 1A of the lens 1. Thus, when the curvature of the lens holding surface 197 of the lens holder 19 for each lens group is made deeper than the convex side lens face 1A of the lens 1, the lens can be held mainly by applying forces to the outer circumferential edge of the lens holding surface 197, as diagrammed in FIG. 19(b). However, only the curvature of the lens holding surface 197 differs, and the structure of the lens holders 19 are otherwise exactly the same. When the difference between the radiuses of curvature of the convex side lens face 1A and the lens holding surface 197 is large, moreover, the adhesion between these two surfaces will decline, wherefore it is preferable that that difference be small.

In this embodiment, furthermore, the curve difference between the lens holding surface 197 and the convex side lens face 1A of the lens 1 is set to at least 1 curve, so that the lens holder 19 will always make contact at the outside, but it is possible to cover cases where these are the same curve or different by about ±1 cover by the thickness and other properties of the double-sided adhesive pad 191.

As diagrammed in FIG. 19(*b*), furthermore, minute undulations 198 are formed in a radial pattern about the circumference of the lens holding surface 197 that constitutes a spherically concave surface, as noted earlier, in order to increase the adhesive binding force with the double-sided adhesive pad 191. The ridges and valleys of these minute undulations 198 extend at more or less a constant angle in the radial direction of the ring-shaped lens holding surface 197.

FIGS. 19(*c*) and 19(*d*) are diagrams that represent the cross-sectional shape of the minute undulations 198 formed in the lens holding surface 197 of this lens holder 19, and the way in which the pad 191 is bonded to those minute undulations 198, respectively. FIGS. 19(*e*) and 19(*f*) are diagrams that, by way of comparison, represent the cross-sectional shape of minute undulations 199 in a conventional lens holder, and the way in which the pad 191 is bonded to those minute undulations 199, respectively. In either case, a cross-sectional shape is configured wherein the ridges in the minute undulations 198 and 199 are ranged in the circumferential direction of the lens holding surface 197.

In the conventional lens holder, as diagrammed in FIGS. 19(*e*) and 19(*f*), the cross-sectional shape of the minute undulations 199 is such that they form surfaces sloped on one side, with respect to the direction of turning, so that the binding force with the pad 191 is maintained by a biting-in action toward the pad 191 caused by the turning. In other words, the wall surfaces 199*b* on the sides toward the direction of turning are configured by vertical surfaces, while the wall surfaces 199*c* on the opposite sides are configured as sloping surfaces, with the apexes 199*a* of the ridges in the minute undulations 199 forming the boundaries therebetween.

However, when the minute undulations 199 having sloping surfaces on only one side in this manner are formed on the lens holding surface 197, although a binding force with the pad 191 is obtained due to the biting-in action toward the pad 191, the adhesion with the pad 191 will decline, as diagrammed in FIG. 19(*f*), so that it is not always possible to obtain a high lens holding force. Also, because the sloped surfaces face in only one direction, when a pressing force acts between the minute undulations and the pad 191, there is a danger that unbalanced turning forces will be applied when the pad thickness is thick, and that the pad 191 will be dislocated slightly in the direction of turning, so that high-precision lens holding will be affected.

In contrast therewith, with this lens holder 19 (φ20), in addition to using an adhesive pad that is on the thick side, the cross-sectional shape of the undulations 198 in the lens holding surface 197 are made so that the sloping sides face in both directions, as diagrammed in FIGS. 19(*c*) and 19(*d*). In other words, the wall surfaces 198*b* on the sides toward the direction of turning and the wall surfaces 198*c* on the opposite sides are configured as sloped surfaces having the same angle of inclination (45 degrees), with the apexes 198*a* of the ridges in the undulations 198 forming the boundaries therebetween.

Accordingly, as diagrammed in FIG. 19(*d*), when the pad 191 is pressed against the minute undulations 198, the pad 191 will be bound evenly to the sloped surfaces on both sides, and, due to the increase in the area of contact, the moderate flexibility and deformability of the pad are well utilized and the lens holding force can be increased. Also, because the pad 191 presses evenly against the sloped surfaces on both sides, which have the same angle of inclination, unbalanced turning forces are cancelled out and cease to be generated, wherefore such problems as the turning of the pad 191 getting shifted or lens holding precision declining no longer occur.

By being able to increase the lens holding force, it is also possible to make the diameter of the lens holding flange 196 smaller, the advantages whereof are discussed below.

First, it then becomes possible to machine lenses of small diameter. Besides that, it is also then possible to reduce the number of types of lens holder prepared according to the lens curve (to weak power and strong power, or with one or two types added therebetween). In other words, a plurality of types of lens holder 19 wherein the curvature of the lens holding surface 197 is altered in stages is prepared, so that, in general, these can be used according to the lens curve. In this case, because it is not realistic to prepare lens holders according to all lens curves, provision is made so that a range of a number of types of lens curve (for strong and weak power or also for a power therebetween) are covered with one kind of lens holder.

Figure 21:
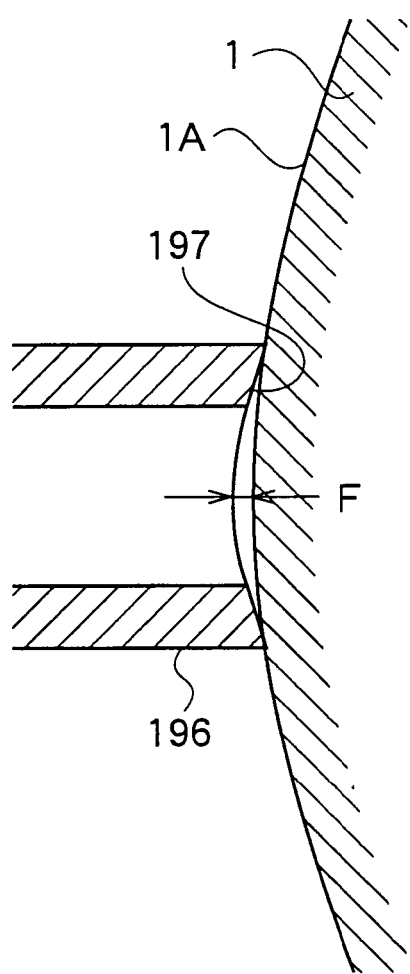
FIG. 21 is a cross-sectional view used in explaining the degree of adhesion based on the relationship between the curvature of a lens and a lens holder in a lens machining apparatus in an embodiment of the present invention.

FIG. 21 diagrams the relationship between the lens face 1A and the lens holding surface 197 of some particular curvature. When the curvature of the lens face 1A is larger than the curvature of the lens holding surface 197, the outer circumferential edge of the lens holding surface 197 strikes the lens face 1A, and a depth difference F is formed between the curve of the lens holding surface 197 and the curve of the lens face 1A. When this depth difference F is large, the level of bonding between the lens holding surface 197 and the lens face 1A declines. Therefore, provision is made so that a lens holder is prepared and can be selected that corresponds with the lens face 1A so that that difference does not become large.

Now, when the outer diameter of the lens holding surface 197 (lens holding flange 196) is made smaller, even when the curve is the same, the depth difference F described above can be reduced, so that lenses of many curves can be handled. Accordingly, if a lens holder is used having a smaller diameter, the range of lens curves that can be covered can be broadened and, as a consequence, the number of types of lens holder can be reduced.

In the example described in the foregoing, moreover, the cross-sectional shape of the minute undulations 198 formed in the lens holding surface 197 is made a ridge shape, but this cross-sectional shape may be made a smooth wavy shape, making the peaks of the ridges and the bottoms of the valleys R-shaped. Also, in the example described in the foregoing, the ridges and valleys in the minute undulations 198 are extended continuously in the radial direction of the ring-shaped lens holding surface 197, but the minute undulations may also be scattered over the entire lens holding surface 197.

Figure 22:
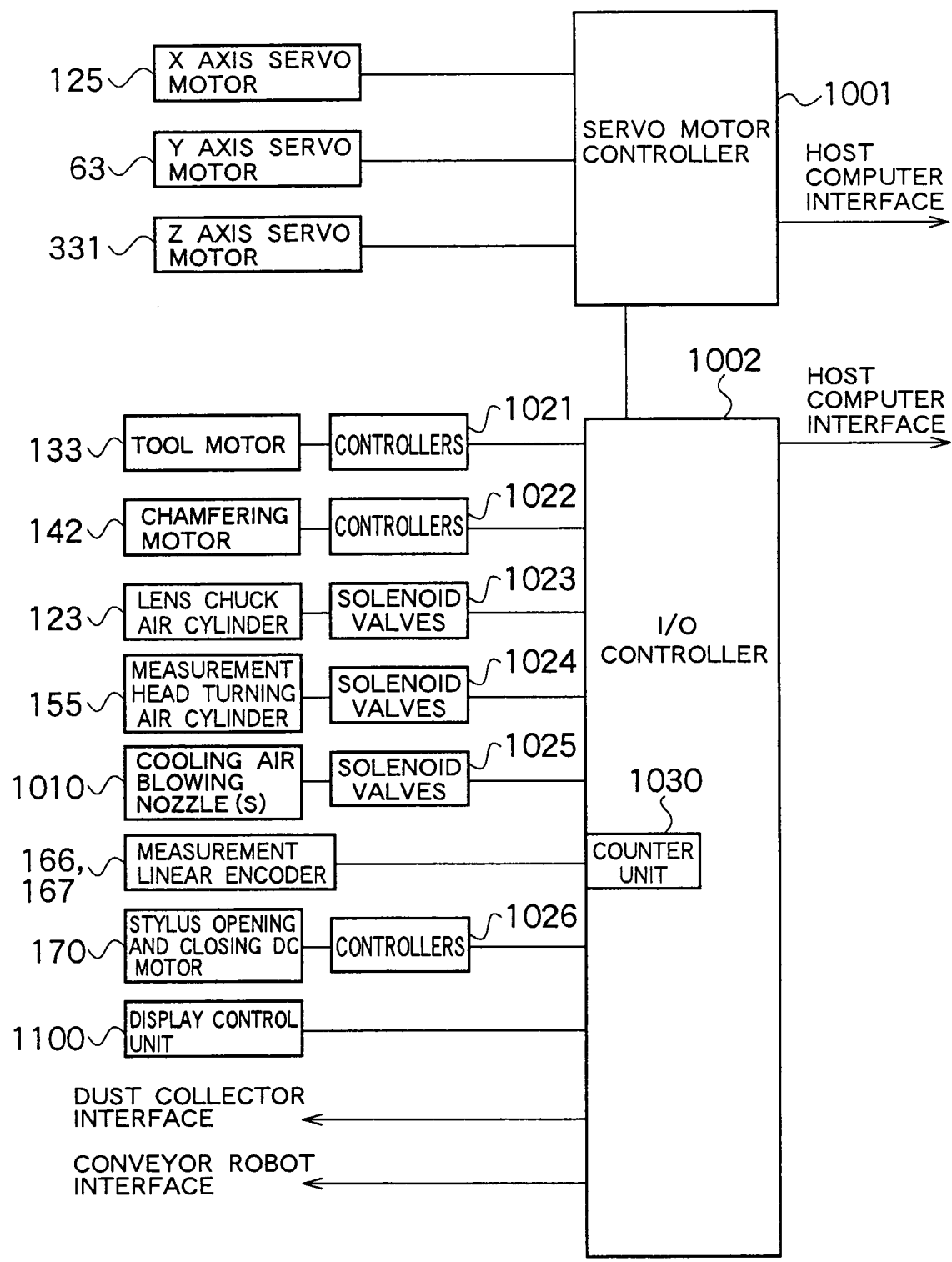
FIG. 22 is a simplified block diagram of the electrical configuration of a lens machining apparatus in an embodiment of the present invention.

FIG. 22 is a block diagram representing the electrical connection relationships, centered on a control device, in the lens machining apparatus 10. Here, however, only the main essentials of the configuration are diagrammed. The control device comprises a servo motor controller 1001 and an I/O controller 1002. The two controllers 1001 and 1002 perform data exchange data back and forth, and also exchange data with a host computer (not shown). From a host computer that manages the overall machining system, lens shape data (including moving radial information, convex side lens face shape, concave side lens face shape, lens thickness, and other diameter, etc.) and machining information and the like are sent. Based on this shape data and machining information so sent, the controllers 1001 and 1002 subject lenses to necessary machining.

The servo motor controller 1001 performs drive control on an X axis servo motor (lens turning motor 125), Y axis servo motor (cutting-in motor 63), and Z axis servo motor (Z direction movement motor 331). The I/O controller 1002 controls the driving of the cutter turning motor (tool motor) 133 for the cutter turning mechanism 13, a chamfering motor (end mill turning mechanism 14 and spindle motor 142), the lens chuck air cylinder 123, the measurement head turning actuator 155, a cooling air blower 1010, and the stylus opening and closing DC motor 170, via controllers and solenoid valves 1021 to 1026. When so doing, the signals from various sensors are used in effecting control.

The I/O controller 1002 also uses a counter unit 1030 to count and fetch the detection signals of the linear encoders 166 and 167 used for making measurements. Further, in addition to effecting necessary displays on a display control unit 1100, the I/O controller 1002 fetches control input signals, and also sends necessary signals to a dust collector interface and conveyor robot interface.

Figure 23:
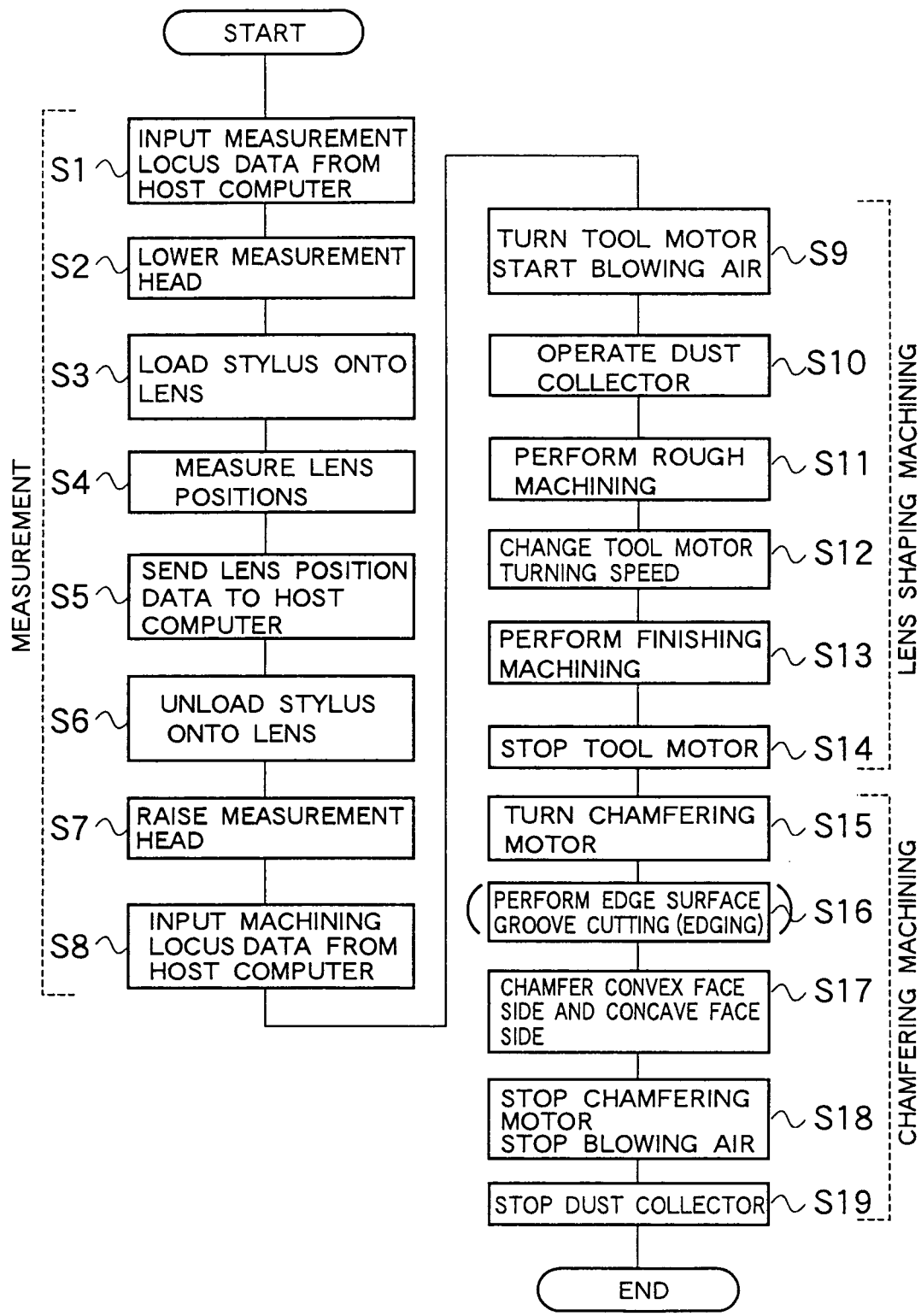
FIG. 23 is a flowchart for machining processes performed by a lens machining apparatus in an embodiment of the present invention.

Next, following the flowchart given in FIG. 23, the flow of control performed by the controllers 1001 and 1002 is described.

When the lens being machined 1 is set in the lens holding unit 12 and a start control input is made, first, measurement locus data sent from the host computer are input (step S1). Next, the measurement head 16 is lowered and positioned in the loaded position (step S2), the styluses 161 and 162 are loaded relative to the lens 1 (step S3), the lens position is measured (step S4), and those measurement data are sent to the host computer (step S5).

When measurements for the entire circumference of the lens have been completed, the styluses 161 and 162 are unloaded from the lens 1 (step S6), and the measurement head 16 is raised to the unloaded position (step S7). Next, machining locus data are input from the host computer (step S8), the motor (tool motor) 133 for the cutter turning mechanism 13 is made to turn while the air blower is started (step S9), and the dust collector is operated (step S10).

Then, rough machining is executed by forced cutting (edging) by turning the cutter 131 a prescribed number of turns (step S11), next the turning speed of the cutter turning motor 133 is changed (step S12), and finishing machining is performed by forced cutting (edging) using the same cutter 131 (step S13). At this time, if bevel edging is required, the bevel cutters Y1 and Y2 are selected and machining is performed.

When the finishing machining is complete, the cutter 131 is stopped (step S14), the spindle motor 142 is turned (step S15), and chamfering is performed by the end mill 141 on the edges of the convex side lens face and the concave side lens face (step S17). Prior to that, instead of bevel edging, when a groove needs to be machined in the lens circumferential surface, before doing the chamfering, the end mill 141 is turned by the spindle motor 142, and a groove is cut (edged) in the lens edge surface (step S16). When chamfering is complete around the entire circumference, the spindle motor 142 and the air blower are stopped (step S18), the dust collector is stopped (step S19), and the machining of one lens is complete.

The rough machining and finishing machining described in the foregoing are done using the same cutter. That is, the flat cutting (edging) cutter H1 is selected for flat cutting (edging), the small bevel cutter Y1 is selected for small bevels, and the large bevel cutter Y2 is selected for large bevels, and everything from rough machining to finishing machining is performed with the same cutter. Accordingly, continuous machining with a single chucking is possible without moving the process, whereupon machining time can be shortened and the equipment made smaller. Also, since it is not necessary to provide tools separately for rough machining and finishing machining, the space used for arranging the tools can be made smaller, and tool management is made easier.

Also, because the lens 1 is forcibly cut (edged) with the cutter 131, the cutting (edging) can be advanced while appropriately setting the cutting-in amount. That being so, the processes leading up to the finished shape can be determined with machining conditions that are optimal for the shape data. For example, it becomes possible to set targets freely, such as how many turns it will take to finish the cutting (edging), or how many seconds it will take to finish the cutting (edging), wherefore machining time can be shortened and machining precision enhanced.

Also, because the chamfering machining is performed with the R part of the tip of the end mill 141 of small diameter used for groove cutting (edging), compared to when a grindstone is used, there is little interference with other places, and small chamferings can be accurately finished. In particular, because one end mill 141 is used for both groove machining and chamfering, the number of tools can be reduced and contributions made to cost reduction, and groove machining and chamfering can be performed more or less continuously with one chucking, so that machining time can be shortened. Only one drive system is needed because the same tool is used for more than one purpose, wherefore the apparatus can be made smaller and costs reduced. And, because the number of tools is not increased, tool management is also made easier.

Furthermore, in the case of this lens machining apparatus 10, the measurement head 16 that performs lens measurements is deployed above the cutter 131 and end mill 141 serving as machining apparatuses, and measurements can be made on the lens 1 held by the lens holding unit 12 by tilting the measurement head 16 forward only when needed, wherefore the measurement head 16 can be mounted on the machining apparatus 10 without resorting to an unreasonable layout. Also, because the measurement head 16 is mounted on the machining apparatus 10 such that the empty space above the cutter 131 and end mill 141 is effectively utilized, the area of the plan of the machining apparatus 10 need not be expanded, and the machining apparatus 10 can be made smaller. Furthermore, because an entire series of processes from measurement to machining can be done with the lens held in the lens holding unit 12, there is no longer any need at all to change the lens to move the process, nor is there any danger of machining precision declining due to lens changing, whereupon the lens shape can be accurately finished.

Next, various methods are described which are implemented in this lens machining apparatus 10 in order to enhance machining precision and machining efficiency, etc.

First, in this lens machining apparatus 10, a number of changeable parameters is used, including the turning speed of the cutter 131 (=tool turning speed), the turning speed of the lens holding shaft 121 when cutting (edging) the circumferential surface by the cutter 131 (=feed speed), the number of revolutions of the lens 1 for the circumferential surface cutting (edging) machining (=number of cutting (edging) turns), the turning speed of the end mill 141 when cutting (edging) grooves or chamfering (=tool turning speed), and the turning speed of the lens holding shaft 121 at that time (feed speed). Provision is made so that, by setting those parameters according to the material of the lens 1 (glass type=type of plastic here), the power (edge thickness=lens material thickness), and whether the machining process is for finishing machining or rough machining, etc., ideal machining conditions can be selected.

Provision is made so that, for example, by changing the parameters (cutter turning speed=tool turning speed, lens holding shaft turning speed=feed speed, number of machining revolutions=number of cutting (edging) turns) according to the material (glass type) and power (edge thickness) of the lens 1, the machining load can be matched, irrespective of the material or power of the lens 1, lens size and lens shape (including bevel position) can be accurately and uniformly finished, and the machined places can be nicely finished. By selecting suitable machining conditions, moreover, machining stress can be reduced, lens axis displacement reduced, tool life extended, and machining time shortened.

Also, by changing the parameters (cutter turning speed=tool turning speed, lens holding shaft turning speed=feed speed) according to whether the machining process is finishing machining or rough machining, finished surfaces can be made in good fashion, and the lens size and lens shape (including bevel position) finished accurately, while machining with the same cutter. By selecting appropriate machining conditions, moreover, machining stress can be reduced, lens axis displacement decreased, and tool life extended.

Also, by changing the turning speed of the cutter 131 and/or the angular turning speed of the lens, in the same machining process, cutting (edging) speed can be made more uniform, wherefore machined surfaces can be finished to uniform conditions.

Furthermore, even when performing groove cutting (edging) machining or chamfering machining by the end mill 141, by changing the parameters (end mill turning speed=tool turning speed, lens holding shaft turning speed=feed speed) according to the material of the lens 1 (=type of material=glass type=type of plastic here), grooves and chamfered parts can be formed precisely, irrespective of the material of the lens 1. By selecting suitable machining conditions, furthermore, tool life can be extended and machining time shortened.

FIG. 24 is a table giving actual examples of parameters (cutter turning speed=tool turning speed, lens holding shaft turning speed=feed speed) determined according to different types of machining processes.

In FIG. 24, the uppermost column in the item columns in the left column of the table is a column that specifies the lens type. The item at the upper level in this column labeled "HY1→machining speed→" is a level which distinguishes the machining speed determined in correspondence with the lens material. Specifically, there is a column to the right of the item column at this level wherein the numerals 1 and 2 are noted. The numeral 1 indicates that the lens material is a diethylene glycol bis-allyl carbonate material (where $n_d$ is 1.50) or a polyurethane material (which is particularly to be preferred). The numeral 2 indicates that the lens material is an epithio type resin. The columns below the column for the numeral 1 are columns where "thick" and "thin" are noted, respectively, which are for classifying the lens material thickness into two classes, for when that thickness is thick and when that thickness is thin, and imparting parameters thereto, respectively.

The numerals "00," "02," "05," etc., noted in the columns below the columns in which "thick" and "thin" are noted are symbols (codes) that represent speeds defined for each type of machining speed classified for each machining type designated in the item column at the same level as the level in which those numerals appear.

For example, for "circumferential surface rough machining feed speed," a code of "02" indicates that the speed is "1 turn in 22 seconds," a code of "03" that the speed is "1 turn in 30 seconds," and a code of "04" that the speed is "1 turn in 38 seconds," respectively.

Similarly, for "circumferential surface rough machining tool turning speed," a code of "05" indicates a speed of "9600 rpm," and a code of "04" a speed of "8000 rpm," respectively.

For "circumferential surface finishing machining feed speed," a code of "05" indicates a speed of "1 turn in 46 seconds." And for "circumferential surface finishing machining tool turning speed," a code of "00" indicates a speed of "2000 rpm," and a code of "02" indicates a speed of "3800 rpm," respectively.

For "groove machining feed speed," a code of "02" indicates a speed of "1 turn in 22 seconds," and a code of "04" a speed of "1 turn in 38 seconds" (the same as for "circumferential surface rough machining feed speed"), while for "groove machining tool turning speed," a code of "01" indicates a speed of "28,000 rpm," and a code of "00" indicates a speed of "20,000 rpm," respectively.

For "chamfering feed speed," a code of "02" indicates a speed of "1 turn in 22 seconds," and a code of "04" indicates a speed of "1 time in 38 seconds" (the same as for "circumferential surface rough machining feed speed"), while for "chamfering took turning speed," a code of "00" indicates a speed of "20,000 rpm," and a code of "01" a speed of "28,000 rpm," respectively.

In the example given in the table described above, for a material designated by the numeral 1, machining is performed under the same machining conditions even when the material thickness differs, but for a material designated by the numeral 2, because the material strength is more brittle than that designated by the numeral 1, provision is made for performing machining slowly over a longer period of time, and the machining conditions are made slightly different depending on the material thickness.

By effecting such control as this, the machining load is balanced, and lens size and lens shape (inclusive of the bevel position) are finished accurately and uniformly, irrespective of the material or power of the lens 1. While that is done, it is also important, in order to neatly finish the machined sites, to make the feed speed (lens shaft turning speed) and tool turning speed suitable, as described in the foregoing, and to set the number of machining revolutions (number of cutting (edging) turns) so as to be suitable.

Figure 25:
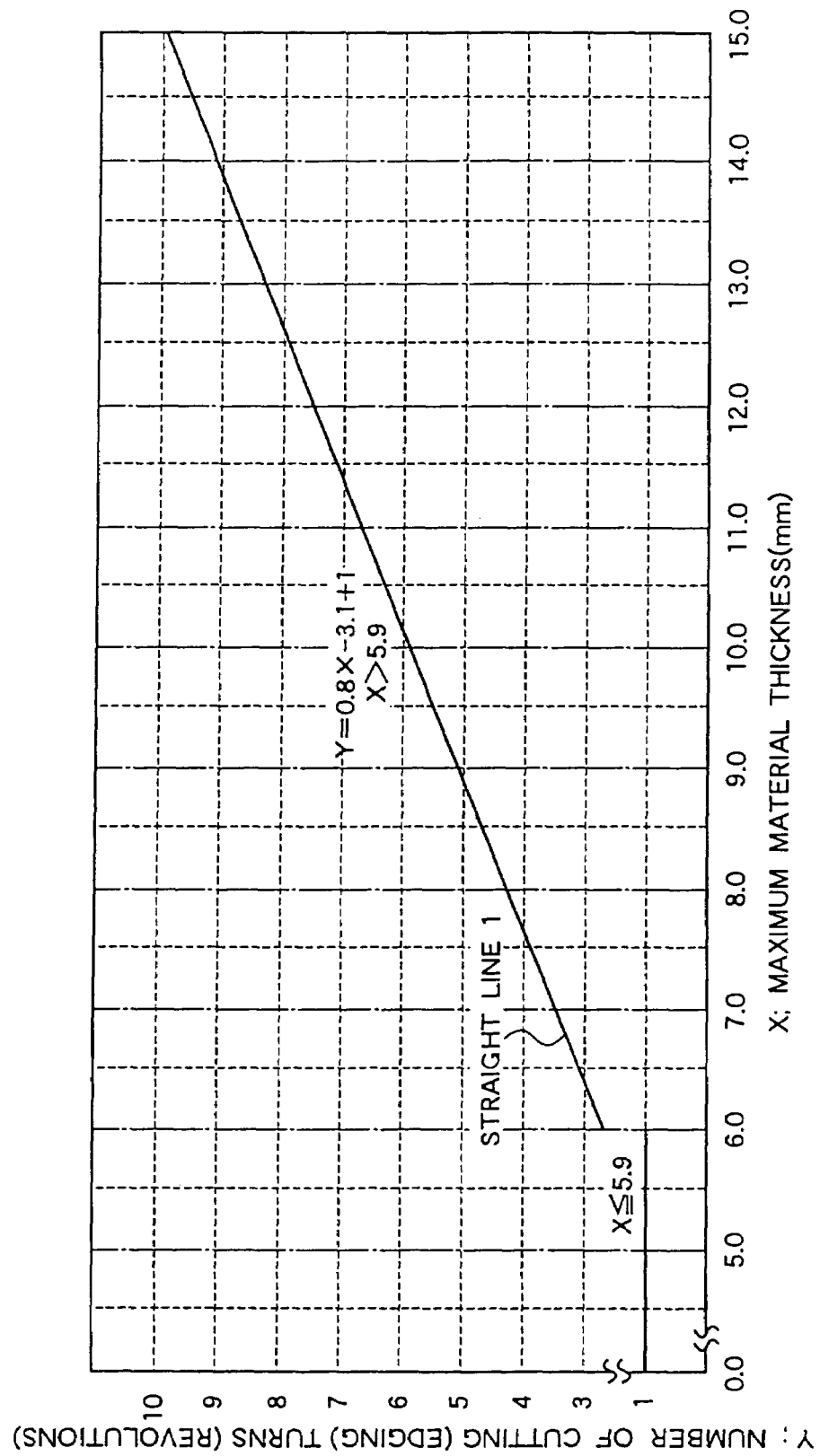

FIG. 25 is a graph that plots the relationship between maximum lens material thickness and number of cutting (edging) turns (number of machining revolutions) for rough machining when machining of a prescribed precision is possible without shaft displacement. In this figure, the number of cutting (edging) turns (number of machining revolutions)—is plotted on the vertical axis Y and the maximum lens material thickness (unit=mm) on the horizontal axis X.

Maximum material thickness here refers to the maximum edge thickness at the outer diameter of the lens in the case of a minus lens, and the maximum material thickness in the lens frame shape in the case of a plus lens. In such cases, moreover, the lens holding shaft turning speed (feed speed) is based on a standard of 1 turn in 22 seconds for rough work, for example, under conditions that the circumference speed is constant and that no shaft displacement occurs. The number of machining revolutions is equal to the number of revolutions required for the cutter to cut in with a spiral locus on the lens plus a final 1 turn (constant) for machining to adjust the shape for which finishing machining portions are left remaining uniformly.

In FIG. 25, the straight line 1 assumes a polyurethane lens material (having a refractive index nd of 1.56 to 1.74 or so, for example) that exhibits intermediate cutting (edging) properties, for the material (type of material) of the lens.

From this graph, a relationship of Y=0.8X−3.1+1 (constant) is indicated (rounded off) in the polyurethane resin type lens, in cases where the maximum material thickness exceeds 5.9 mm. Here, a relationship of Y=0.87X−3.1+1 (constant) can be used in an epithio type resin lens having different material properties, for example. Also, in cases where the maximum material thickness is 5.9 mm or less, the value of Y becomes uniformly 2 without being dependent on X.

Figure 28A:
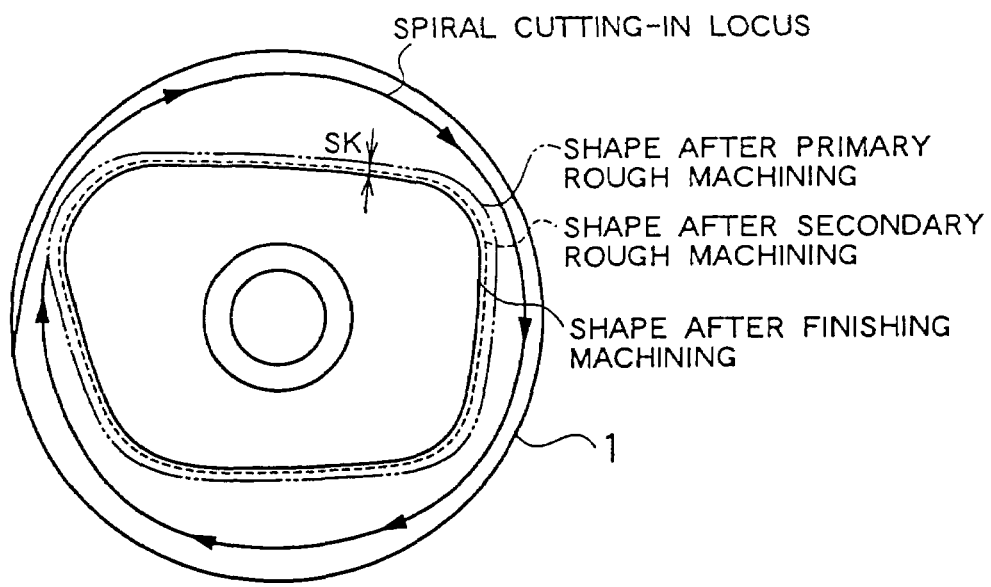
FIG. 28 is an explanatory diagram for the machining processing indicated in FIG. 23(b), with a front elevation of a lens given at (a) and a cross-sectional view of a lens given at (b).
Figure 28B:
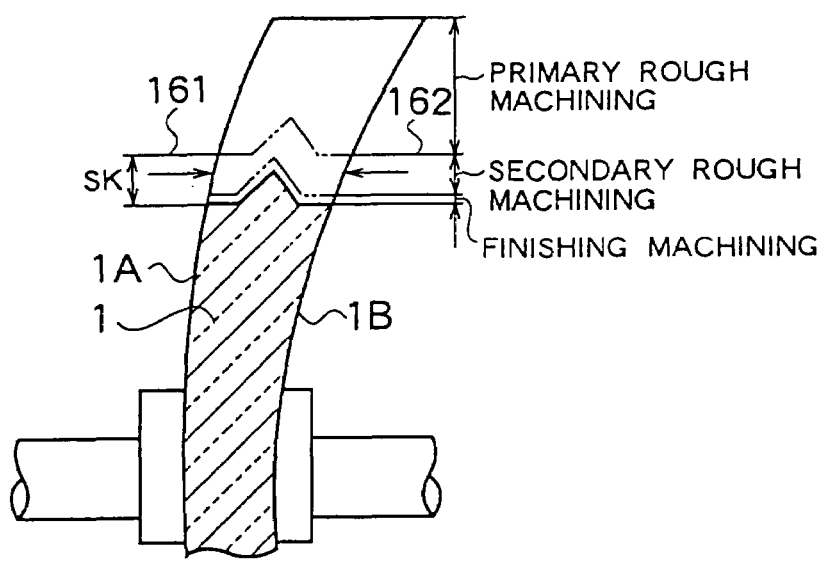

Furthermore, in the rough machining, regarding the total number of cutting (edging) turns except the final 1 turn, the cutting-in locus when doing cutting (edging) is a spiral, as will be described subsequently (with reference to FIG. 28(*a*), for example).

By using the graph, etc., described in the foregoing, the number of machining revolutions (number of cutting (edging) turns) can be set to a suitable value according to the lens material thickness.

Figure 26:
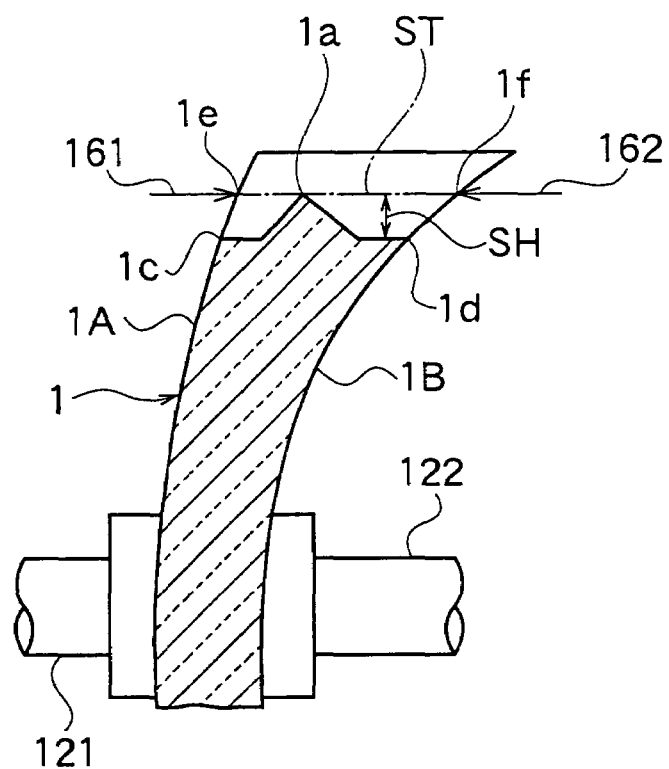
FIG. 26 is an explanatory diagram for a method of correcting lens measurements performed with a lens machining apparatus in an embodiment of the present invention.

With this lens machining apparatus 10, moreover, computation functions such as are described below are provided so that lens position data necessary when performing bevel edging can be accurately obtained. Such is described using FIG. 26.

Ordinarily, in order to obtain position data on the lens surfaces 1A and 1B, the styluses 161 and 162 are made to trace over the lens faces 1A and 1B according to the lens shape data, and the positions 1e and 1f on the lens faces are measured by detecting the positions of the styluses 161 and 162 at each point on that locus. The positions of the styluses 161 and 162 in this case are on an extended line ST in the direction of the lens holding shaft at the apex of the bevel 1a formed when the lens 1 was bevel-edged.

However, when bevel edging is performed simply on the basis of the position data (coordinate data at 1e and 1f) found in this way, a problem arises in that it is not possible to accurately finish the position of the bevel 1a. That is, although it is desired to precisely find the position of the bevel 1a in the lens circumferential surface in the machined condition, based on the edges 1c and 1d on both sides of the lens circumferential surface, the actual bevel edging is done based on data measured at the positions 1e and 1f on the outer circumference side, removed from the positions of the two side edges 1c and 1d by the measure of the bevel height SH. Accordingly, the bevel 1a cannot be finished with high precision.

One conceivable solution to this would be to cause the styluses 161 and 162 to trace at positions that are the positions defined beforehand by the lens shape data from which the bevel height SH has been subtracted, thereby measure beforehand the positions of the edges 1c and 1d at the two edges of the lens circumferential surface in the machined condition, and perform bevel edging based on those position data.

When that is done, however, it is necessary to cause the styluses 161 and 162 to trace closer in toward the center of the lens than the positions defined by the lens shape data, thus making it necessary to prepare data beforehand for making the styluses 161 and 162 do their tracing that are separate from the lens shape data. Also, in order to cause tracing closer in toward the center of the lens, there is a danger that the contact marks from the styluses 161 and 162 will remain within the range of the lens faces 1A and 1B that may possibly be finally used.

Thereupon, in this lens machining apparatus 10, provision is made so that the coordinate values for the points 1c and 1d are calculated based on measured coordinate data for the points 1e and 1f, and on design data for the lens 1 provided separately.

Here, by design data for the lens 1 is meant lens property data (refractive index, abbe number, specific gravity, etc.), prescription related data (lens power, cylinder axis, addition (Add), prism, base direction, decentration, outer diameter, distance PD, near PD, lens thickness, VR value (CR value+ VC value)), frame data (shape, DBL, FPD, frame curve, and frame curve, etc.), frame forward tilt, type of bevel, and other machining-process designating data. In the design data for the lens 1 in this case are contained moving radial data, convex side lens face shape data, concave side lens face shape data, lens thickness data, and outer diameter data, wherein are also contained a limited number of coordinate data (ρi, θi, Zi) that define the shapes of the convex side lens face 1A and the concave side lens face 1B, and it is possible to extract the coordinates for any point on either the convex side lens face 1A or the concave side lens face 1B even in the case of a aspherical lens. Accordingly, by using these design data together with the actually measured data measured at trace points on the extended line SH in the lens holding shaft direction for the bevel apex, the positions of the points 1c and 1d can be precisely calculated. Then, by using those coordinate data for the points 1c and 1d, the bevel 1a can be precisely machined. Provision is made so that the design data are made available from lens design program data in the host computer.

In this lens machining apparatus 10, furthermore, the measurement head 16 for measuring lens shapes and lens positions is made so that, as necessary, it can make an approach from a holding location toward the lens 1 held by the lens holding unit 12. Therefore, in addition to measurements prior to machining, lens shapes and lens positions can also be measured during machining, in special cases. An example of a case wherein measurement is implemented during machining is described next.

Figure 27A:
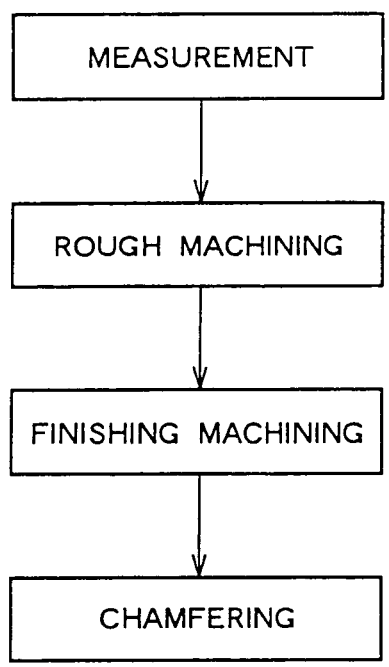
Figure 27B:
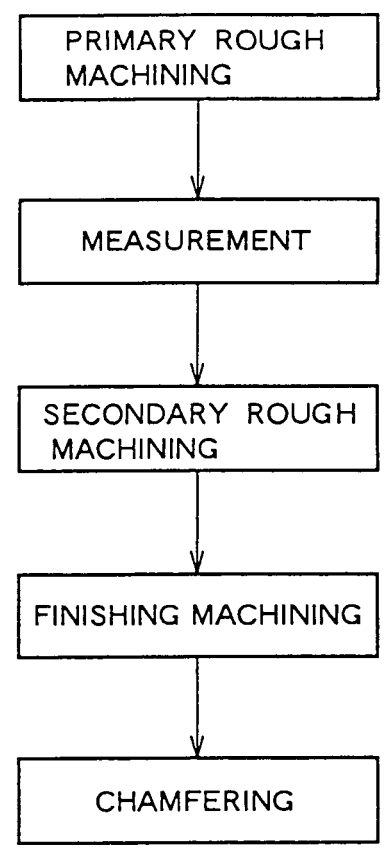
FIG. 27(b) is a flowchart therefor.

An example of machining processing is diagrammed in FIG. 27, with machining processing in an ordinary case diagrammed at (a), and machining processing in a special case diagrammed at (b). In the machining processing diagrammed in FIG. 27(a), lens measurement is performed at the stage of an unmachined lens, while in the machining processing diagrammed in FIG. 27(b), lens measurement is performed at a stage midway along in rough machining. In this lens machining apparatus 10, provision is made so that machining is implemented after selecting either the machining processing in (a) or the machining in (b), according to the lens material (glass type) and power (edge thickness). The reason for providing the special machining processing diagrammed in FIG. 27(b) as a selection choice is that there are cases where differences arise in the values of lens measurements made at the unmachined lens stage and a stage midway along in rough machining, such that, when the ordinary machining processing given in FIG. 27(a) is made the standard for all cases, there will be times when it will not be possible to accurately finish the bevel position in final finishing machining.

In the case of the ordinary machining processing diagrammed in FIG. 27(a), lens measurements are conducted at the outset. Rough machining is then implemented, followed next by finishing machining, and followed last of all by chamfering to yield the lens in its final shape. The rough machining is performed up to a point that leaves material for the finishing cutting (edging). The last of the cutting (edging) material is removed in the finishing machining and the final dimensions are finished.

In the case of the special machining processing diagrammed in FIG. 27(b), on the other hand, primary rough machining is first implemented, after which lens measurements are made. As diagrammed in FIGS. 28(a) and 28(b), primary rough machining is performed until dimensions are reached which leave a measurable width SK relative to the finished dimensions. In the rough machining employed in the ordinary machining processing, only the cutting (edging) material remaining for finishing is left remaining, but it is difficult to have the styluses 161 and 162 make traces within the range of cutting (edging) material no more extensive than that. Thereupon, in this machining processing, by going ahead with the primary rough machining, machining is performed up to a point where a width that is in a measurable range (1.5 to 1.8 mm or so, for example) is left remaining.

As to why this is done, as stated earlier, when an unmachined lens is subjected all at once to rough machining that leaves only enough cutting (edging) material for the finishing, there are cases where, with certain special lenses, the lens holding condition changes. That is, depending on the lens holding condition, at the unmachined lens stage, the portion of material that is to be removed in the rough machining thereafter exhibits a reinforcing effect and elicits holding balance, arresting holding deformation before it appears on the surface. When that portion of lens material is removed in the rough machining, the reinforcing effect disappears, and, in some cases, holding deformation appears on the surface. Accordingly, in such cases, even if lens measurement values are found at the unmachined lens stage, those initial lens position data will change at a stage after the rough machining has actually been done, and reliability will decline. Examples are bifocal lenses wherein there is a segment, and lenses having thick edge thickness.

Thus, after implementing lens measurement at this stage at which primary rough machining has been performed, and obtaining lens information containing the edge thickness in a condition wherein the effects of lens holding deformations are not received, by then performing secondary rough machining, and removing cutting (edging) material up to the stage where the cutting (edging) material for finishing is left remaining, and thereafter implementing finishing machining, in the same manner as in machining processing in ordinary cases, and implementing chamfering machining last of all, the lens is obtained in its final shape.

Thus, by implementing lens measurement at a stage midway along in the rough machining, highly reliable lens measurement values can be obtained, wherefore, by performing subsequent finishing machining using those lens measurement values, the lens shape and bevel shape can be finished accurately. In this embodiment, an example is cited wherein a cutter is used as a tool, but a grindstone may be used instead of a cutter if the same degree of control can be maintained as with a cutter.

INDUSTRIAL APPLICABILITY

In terms of industrial usefulness, with the present invention, as described in the foregoing, it becomes possible to provide a lens machining apparatus and lens machining method wherewith, when a lens being machined for use in spectacles is held by the center of the lens, the circumferential surface of the held lens being machined is edged away with a revolving machining tool for use in circumferential surface machining and the lens being machined is also made to revolve about the center of the lens, and thereby the circumferential surface is edged away about the entire circumference of the lens being machined, and thereby a lens having a prescribed circumferential edge shape is machined, provision is made so that edging machining on the lens circumferential surface, inclusive of bevel edging, groove machining to form a grove in the lens circumferential surface, and chamfering machining to chamfer the edges where the lens circumferential surface and lens faces intersect are performed, while holding the lens being machined by the lens holding unit, maintaining the condition of holding by that lens holding unit unchanged, whereby not only can everything required in eyeglass lens machining, from measurement to various types of machining, be performed with a single chucking operation, but high-precision machining can also be realized.

What is claimed is:

1. A lens machining method comprising:
   machining a plastic lens for spectacles held at a center of the plastic lens such that a circumferential surface of the held plastic lens is edged away by a revolving machining tool for circumferential surface machining by causing the held plastic lens to revolve about the center of the plastic lens in order to edge away the circumferential surface about an entire circumference of the held plastic lens, thereby machining the held plastic lens to a prescribed circumferential edge shape, wherein;
   the machining includes rough machining and finishing machining being performed by forcibly edging the plastic lens using the same revolving machining tool,
   the forcible edging using the same revolving machining tool machines the plastic lens by reading and using a parameter of each machining condition, including a turning speed of the revolving machining tool and a turning speed of the held plastic lens, from a table previously prepared, and a number of revolutions of the plastic lens that is calculated based on a type of material of the plastic lens, an edge thickness of the plastic lens being machined, a kind of machining and the turning speed of the plastic lens,
   the table includes columns and rows so as to specify a corresponding parameter by designating a column and a row in accordance with the plastic lens being machined,
   the rows include a first division for each number of revolutions of a lens corresponding to the type of material of the plastic lens being machined, and each first division includes a further division for each edge thickness of the plastic lens being machined,
   the columns have a first division for each kind of a plurality of machining including a circumferential surface rough machining and a circumferential finishing machining and each first division includes a further division for the turning speed of the plastic lens and a turning speed of the revolving machining tool,
   a value of the corresponding parameter is provided at a location in the table where a designated column intersects with a designated row, and
   the lens is machined based on the number of revolutions.

\* \* \* \* \*